US012657999B2

(12) United States Patent
Takahashi et al.

(10) Patent No.: US 12,657,999 B2
(45) Date of Patent: Jun. 16, 2026

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Reo Takahashi, Tokyo (JP); Mitsuharu Isojima, Tokyo (JP); Yumi Furukawa, Tokyo (JP); Yusuke Hayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 383 days.

(21) Appl. No.: 18/359,117

(22) Filed: Jul. 26, 2023

(65) Prior Publication Data

US 2023/0368612 A1 Nov. 16, 2023

Related U.S. Application Data

(63) Continuation of application No. PCT/JP2022/002263, filed on Jan. 21, 2022.

(30) Foreign Application Priority Data

Jan. 29, 2021 (JP) ................................ 2021-013099

(51) Int. Cl.
*G07F 17/32* (2006.01)

(52) U.S. Cl.
CPC ........ *G07F 17/3244* (2013.01); *G07F 17/323* (2013.01); *G07F 17/329* (2013.01)

(58) Field of Classification Search
CPC . G07F 17/3244; G07F 17/323; G07F 17/3239
See application file for complete search history.

(56) References Cited

U.S. PATENT DOCUMENTS

2005/0075889 A1* 4/2005 Gomes ............... G06Q 30/0212 705/14.27
2009/0117970 A1* 5/2009 De Waal ............. G07F 17/3211 463/20

(Continued)

FOREIGN PATENT DOCUMENTS

JP 2014-57869 A 4/2014
JP 6770144 B1 10/2020

OTHER PUBLICATIONS

International Search Report issued in PCT/JP2022/002263 on Apr. 12, 2022 (5 pages).

(Continued)

*Primary Examiner* — Steve Rowland
(74) *Attorney, Agent, or Firm* — Osha Bergman Watanabe & Burton LLP

(57) ABSTRACT

A non-transitory computer readable medium stores a program causing a computer to execute: determining any one of a plurality of winning types; awarding a reward to a player on the basis of the determined winning type; setting reward group information in which at least one reward group configured by combining a plurality of winning types or a plurality of rewards is defined; deciding that a reward group in which the number of determined winning types or the number of rewards awarded to the player has reached a predetermined number is an achieved reward group; and allowing the reward group information to be changed on condition that the number of achieved reward groups has reached a preset particular number.

18 Claims, 21 Drawing Sheets

(56) References Cited

U.S. PATENT DOCUMENTS

2013/0337892 A1* 12/2013 Luciano, Jr. ............ G07F 17/32
463/25
2015/0279162 A1* 10/2015 Frank .................. G07F 17/3244
463/25

OTHER PUBLICATIONS

Written Opinion of the International Searching Authority issued in PCT/JP2022/002263 on Apr. 12, 2022 (3 pages).
Office Action issued in corresponding Japanese Patent Application No. 2021-013099, mailed on Sep. 14, 2021 (7 pages).
Office Action issued in corresponding Japanese Patent Application No. 2021-013099, mailed on Jan. 11, 2022 (7 pages).
Office Action issued in corresponding Japanese Patent Application No. 2021-013099, mailed on May 10, 2022 (5 pages).
D4DJ Grumiku; Event "Ultimate P-key Cooking"; AppMedia [online]; Dec. 1, 2020; Retrieved from the Internet on Sep. 3, 2021: URL: <https://appmedia.jp/d4dj/5696423> (12 pages).

* cited by examiner

| REWARD | WINNING PROBABILITY |
|---|---|
| REWARD A (1st PRIZE) | 2% |
| REWARD B (2nd PRIZE) | 5% |
| REWARD C (3rd PRIZE) | 8% |
| REWARD D (4th PRIZE) | 10% |
| REWARD E (5th PRIZE) | 15% |
| REWARD F (6th PRIZE) | 15% |
| REWARD G (7th PRIZE) | 20% |
| REWARD H (8th PRIZE) | 25% |

FIG.4

| SHEET TYPE | DETERMINATION PROBABILITY |
|---|---|
| SPECIAL-GIFT SHEET a | 5% |
| SPECIAL-GIFT SHEET b | 5% |
| SPECIAL-GIFT SHEET c | 5% |
| SPECIAL-GIFT SHEET d | 5% |
| SPECIAL-GIFT SHEET e | 5% |
| SPECIAL-GIFT SHEET f | 5% |
| SPECIAL-GIFT SHEET g | 5% |
| SPECIAL-GIFT SHEET h | 5% |

FIG.6

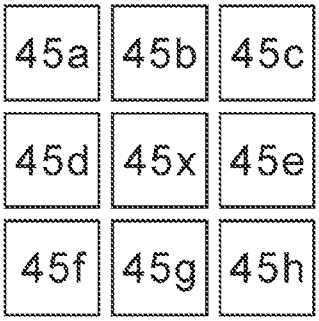
FIG.7A
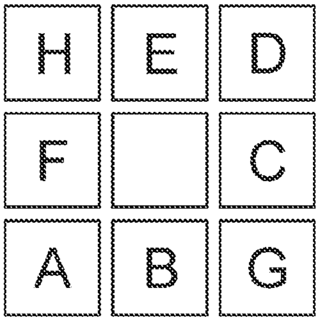
FIG.7B
| ARRANGEMENT PATTERN | REWARD FRAME | | | | | | | |
|---|---|---|---|---|---|---|---|---|
| | 45a | 45b | 45c | 45d | 45e | 45f | 45g | 45h |
| ARRANGEMENT PATTERN a | H | E | D | F | C | A | B | G |
| ARRANGEMENT PATTERN b | G | H | E | D | F | C | A | B |
| ARRANGEMENT PATTERN c | B | G | H | E | D | F | C | A |
| ARRANGEMENT PATTERN d | A | B | G | H | E | D | F | C |
| ARRANGEMENT PATTERN e | C | A | B | G | H | E | D | F |
| ARRANGEMENT PATTERN f | F | C | A | B | G | H | E | D |
| ARRANGEMENT PATTERN g | D | F | C | A | B | G | H | E |
| ARRANGEMENT PATTERN h | E | D | F | C | A | B | G | H |
FIG.7C

| REWARD GROUP No. | REWARD COMBINATION | | |
|---|---|---|---|
| No.1 | H | G | |
| No.2 | A | D | |
| No.3 | B | E | |
| No.4 | C | F | |
| No.5 | D | E | H |
| No.6 | A | B | G |
| No.7 | A | F | H |
| No.8 | C | D | G |

| REWARD | EXECUTION PATTERN | | | | |
|---|---|---|---|---|---|
| | A | B | C | D | E |
| REWARD A (1st PRIZE) | 5% | 10% | 15% | 30% | 40% |
| REWARD B (2nd PRIZE) | 10% | 15% | 25% | 50% | 0% |
| REWARD C (3rd PRIZE) | 10% | 25% | 25% | 40% | 0% |
| REWARD D (4th PRIZE) | 20% | 25% | 25% | 30% | 0% |
| REWARD E (5th PRIZE) | 20% | 25% | 25% | 30% | 0% |
| REWARD F (6th PRIZE) | 40% | 25% | 25% | 10% | 0% |
| REWARD G (7th PRIZE) | 40% | 25% | 25% | 10% | 0% |
| REWARD H (8th PRIZE) | 40% | 25% | 25% | 10% | 0% |

FIG.10A

| NUMBER OF SIMULTANEOUSLY ESTABLISHED LINES | EXECUTION PATTERN | | | |
|---|---|---|---|---|
| | BLINKING | RED | PURPLE | RAINBOW |
| 0 | 100% | 0% | 0% | 0% |
| 1 | 80% | 20% | 0% | 0% |
| 2 | 20% | 30% | 50% | 0% |
| 3 | 10% | 20% | 30% | 40% |

FIG.10B

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2022/002263, filed on Jan. 21, 2022, which claims priority to Japanese Patent Application No. 2021-013099, filed on Jan. 29, 2021, the entire contents of which are incorporated by reference herein.

BACKGROUND ART

Technical Field

The present invention relates to an information processing program, an information processing method, and an information processing system.

There are conventionally well-known games employing a so-called "gacha", in which items, etc. can be gained by lottery by consuming in-game currency. PTL 1 discloses a box lottery in which the types and the number of items that can be gained by lottery are set in advance. In the box lottery, one of the remaining items that have not been gained by a player is determined to be a gained item. Also, in a box lottery disclosed in PTL 1, items that can be gained are reset when a big jackpot item is gained.

CITATION LIST

Patent Literature

Patent Literature 1: JP 6770144 B

SUMMARY OF INVENTION

Technical Problem

As described above, a lottery that allows items, etc. to be gained is problematic in that when a player fails to gain a desired item, game motivation decreases.

An object of the present invention is to provide an information processing program, an information processing method, and an information processing system that can enhance game motivation.

Solution to Problem

In order to solve the aforementioned problem, an information processing program causes a computer to execute:

- a process for determining any one of a plurality of winning types;
- a process for awarding a reward to a player on the basis of the determined winning type;
- a process for setting reward group information in which at least one reward group configured by combining a plurality of the winning types or a plurality of the rewards is defined;
- a process for deciding that a reward group in which the number of determined winning types or the number of rewards awarded to the player has reached a predetermined number is an achieved reward group; and
- a process for allowing the reward group information to be changed on condition that the number of achieved reward groups has reached a preset particular number.

In the process for deciding that a reward group is an achieved reward group,

- if all the winning types constituting one of the at least one reward group are determined or all the rewards constituting one of the at least one reward group are awarded to the player, the reward group may be decided as being the achieved reward group, and
- the particular number may be smaller than the number of reward groups defined in one of the items of reward group information.

The plurality of winning types may include winning types that are determined at probabilities different from each other.

The information processing program may cause the computer to further execute a process for awarding the player a special gift corresponding to the number of achieved reward groups.

The information processing program may cause the computer to further execute a process for executing a suggestion presentation for suggesting whether or not the number of determined winning types or the number of rewards awarded to the player for any of the achieved reward groups has reached the predetermined number.

In order to solve the aforementioned problem, an information processing method is executed by at least one computer and causes the at least one computer to execute:

- a step for determining any one of a plurality of winning types;
- a step for awarding a reward to a player on the basis of the determined winning type;
- a step for setting reward group information in which at least one reward group configured by combining a plurality of the winning types or a plurality of the rewards is defined;
- a step for deciding that a reward group in which the number of determined winning types or the number of rewards awarded to the player has reached a predetermined number is an achieved reward group; and
- a step for allowing the reward group information to be changed on condition that the number of achieved reward groups has reached a preset particular number.

In order to solve the aforementioned problem, an information processing system includes at least one computer that executes:

- a process for determining any one of a plurality of winning types;
- a process for awarding a reward to a player on the basis of the determined winning type;
- a process for setting reward group information in which at least one reward group configured by combining a plurality of the winning types or a plurality of the rewards is defined;
- a process for deciding that a reward group in which the number of determined winning types or the number of rewards awarded to the player has reached a predetermined number is an achieved reward group; and
- a process for allowing the reward group information to be changed on condition that the number of achieved reward groups has reached a preset particular number.

Effects of Disclosure

According to the present invention, it is possible to enhance game motivation.

BRIEF DESCRIPTION OF DRAWINGS

FIG. 4 is a drawing for illustrating an example of a reward lottery table.

FIG. 6 is a drawing for illustrating an example of a sheet lottery table.

FIG. 7A is a drawing for illustrating decision frames.

FIG. 7B is a drawing for illustrating an example of correspondence relationships between reward frames and rewards.

FIG. 7C is a drawing for illustrating reward arrangement patterns for each special-gift sheet.

FIG. 10A is a drawing for illustrating an example of a first-suggestion-presentation determination table.

FIG. 10B is a drawing for illustrating an example of a second-suggestion-presentation determination table.

DESCRIPTION OF EMBODIMENTS

An aspect of an embodiment according to the present invention will be described below in detail with reference to the accompanying drawings. The values, etc. given in this embodiment are merely examples for facilitating understanding, and do not limit the present invention unless otherwise specifically mentioned. In this description and the drawings, the same reference signs are attached to elements having substantially the same functions and configurations, omitting repeated descriptions thereof, and elements that are not directly related to the present invention are not shown.

(Overall Configuration of Information Processing System S)

Figure 1:
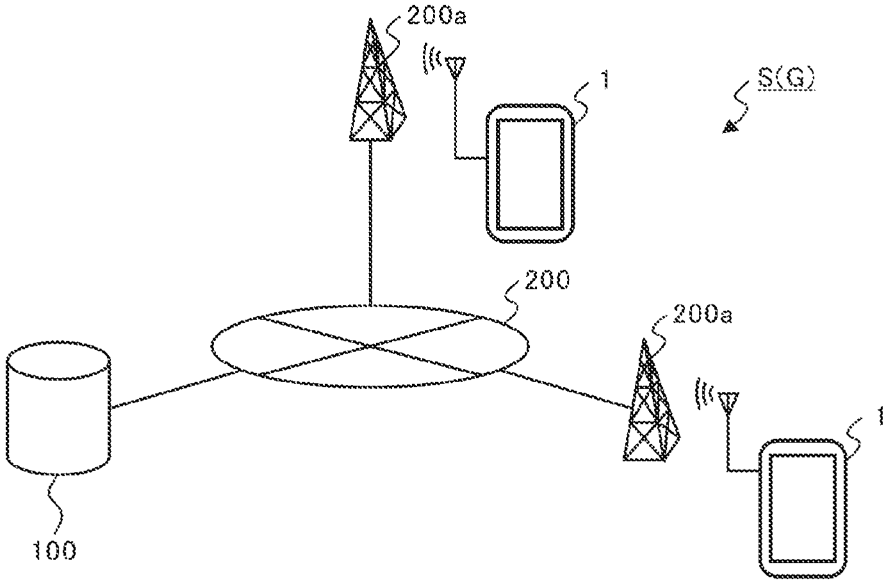
FIG. 1 is an illustration showing a schematic configuration of an information processing system.

FIG. 1 is an illustration showing a schematic configuration of an information processing system S. The information processing system S is what is called a client-server system, including player terminals 1 functioning as clients, i.e., game terminals, a server 100, and a communication network N having communication base stations Na.

In the information processing system S according to this embodiment, a player terminal 1 and the server 100 function as a game device G. The player terminal 1 and the server 100 individually have assigned thereto roles for controlling the proceeding of the game such that it is possible to proceed with the game through cooperation between the player terminal 1 and the server 100.

Each of the player terminals 1 can establish communication with the server 100 via the communication network N. The player terminals 1 widely include electronic appliances that can be communicatively connected to the server 100 by wire or wirelessly. Examples of the player terminals 1 include smartphones, mobile phones, tablet devices, personal computers, and game machines. This embodiment will be described in the context of the case where smartphones are used as the player terminals 1.

The server 100 is communicatively connected to the plurality of player terminals 1. The server 100 accumulates various kinds of information for each player who plays a game. Furthermore, the server 100 executes, mainly on the basis of operations input from each of the player terminals 1, processes for updating the accumulated information, downloading images and various types of information to the player terminal 1, etc.

The communication base stations Na are connected to the communication network N, and send information to and receive information from the player terminals 1 wirelessly. The communication network N is configured of a mobile phone network, the Internet, a local area network (LAN), a dedicated circuit, etc., and realizes wired or wireless communicative connection between the player terminals 1 and the server 100.

(Hardware Configurations of Player Terminal 1 and Server 100)

Figure 2A:
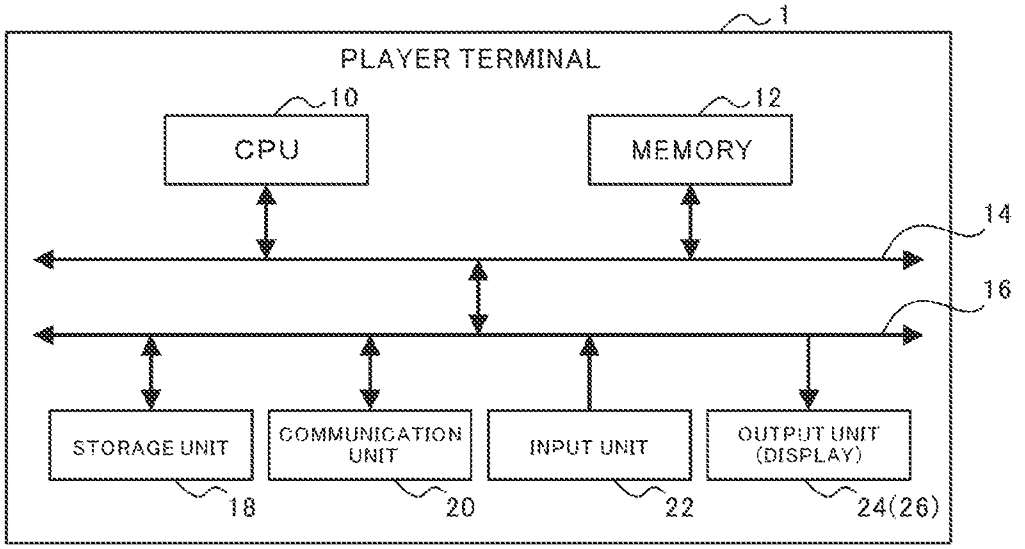
FIG. 2A is a drawing for illustrating the hardware configuration of a player terminal.
Figure 2B:
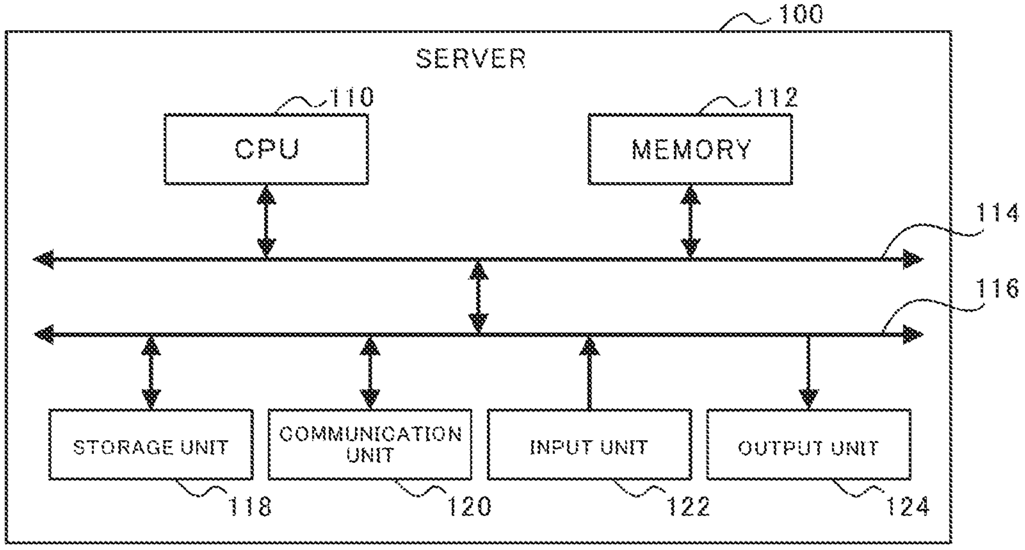
FIG. 2B is a drawing for illustrating the hardware configuration of a server.

FIG. 2A is a diagram for illustrating the hardware configuration of the player terminal 1. Furthermore, FIG. 2B is a diagram for illustrating the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

The configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24 of the player terminal 1, respectively. Thus, a description of the hardware configuration of the player terminal 1 will be given below, and a description of the server 100 will be omitted.

The CPU 10 runs programs stored in the memory 12 to control the proceeding of the game. The memory 12 is configured of a read only memory (ROM) or a random access memory (RAM), and stores programs and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various kinds of programs and data. At the player terminal 1, programs and data stored in the storage unit 18 are loaded into the memory 12 (RAM) by the CPU 10.

The communication unit 20 is communicatively connected to the communication base stations Na wirelessly, and sends information to and receives information from the server 100 via the communication network N, such as various kinds of data and programs. At the player terminal 1, the programs, etc. received from the server 100 are stored in the memory 12 or the storage unit 18.

The input unit 22 is configured of, for example, a touchscreen, buttons, a keyboard, a mouse, a cross key, or an analog controller with which player operations are input (operations are accepted). Alternatively, the input unit 22 may be a special controller provided in the player terminal 1 or connected (externally attached) to the player terminal 1. Alternatively, the input unit 22 may be configured of an acceleration sensor that detects tilting or movement of the player terminal 1 or a microphone that detects speech of the player. That is, the input unit 22 may widely include devices that enable the player to input his or her intents in distinguishable manners.

The output unit 24 is configured to include a display device and a speaker. The output unit 24 may be a device connected (externally attached) to the player terminal 1. In this embodiment, the player terminal 1 is provided with a display 26 as the output unit 24 and is provided with a touchscreen as the input unit 22, wherein the touchscreen is overlaid on the display 26.

(Game Content)

Next, a lottery game provided by the information processing system S and the game device G according to this embodiment will be described. The lottery game in this embodiment can be applied to any game field, including an action game, a battle game, a role playing game (RPG), a card game, and a shooting game. Thus, specific game content is not particularly limited.

In the lottery game, a plurality of rewards that can be awarded to a player are preset. The player can execute the lottery game by consuming in-game currency. In the lottery game, a lottery process in which any one of the plurality of provided rewards is won is executed, and the won reward is awarded to the player. In more detail, in the lottery game, a lottery process for determining any one of a plurality of provided winning types is executed, and a reward corresponding to the winning type that has been won in the lottery process is awarded to the player. Because a winning type and a reward correspond in a one-to-one manner, the following description assumes that a winning type is a reward to facilitate understanding. Furthermore, hereinafter, a reward that has been won in the lottery process and is awarded to the player accordingly is referred to as a won reward. Rewards are, for example, characters and various types of items that can be used in the game, and rewards that have been awarded to the player are stored in association with player information.

In short, the lottery game allows the player to gain and possess characters, items, etc. in exchange for in-game currency. It should be noted that the content of a reward can be set as appropriate, and the specific content of a reward is not particularly limited.

In addition, events are held on an irregular basis in the game according to this embodiment. While an event is being held, the player can play a predetermined game. In addition, the player can gain event-dedicated currency by playing or clearing the predetermined game. By consuming event-dedicated currency as in-game currency, the player can execute an event-dedicated lottery game only while an event is being held.

In this embodiment, it is assumed that the lottery game described below is an event-dedicated lottery game executable only while an event is being held. It should be noted, however, that the lottery game described below need not be dedicated to events, and may also be executable constantly while no events are being held.

Figure 3A:
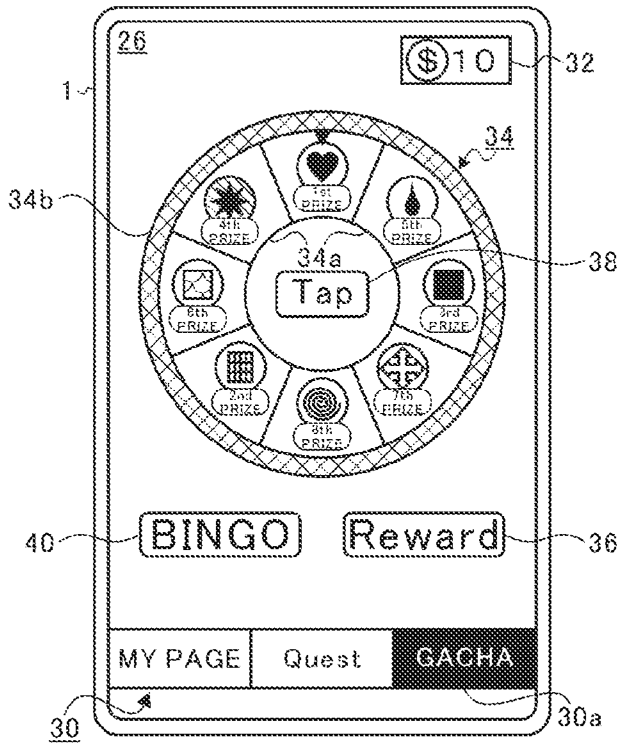
FIG. 3A is a drawing for illustrating an example of a reward lottery game.
Figure 3B:
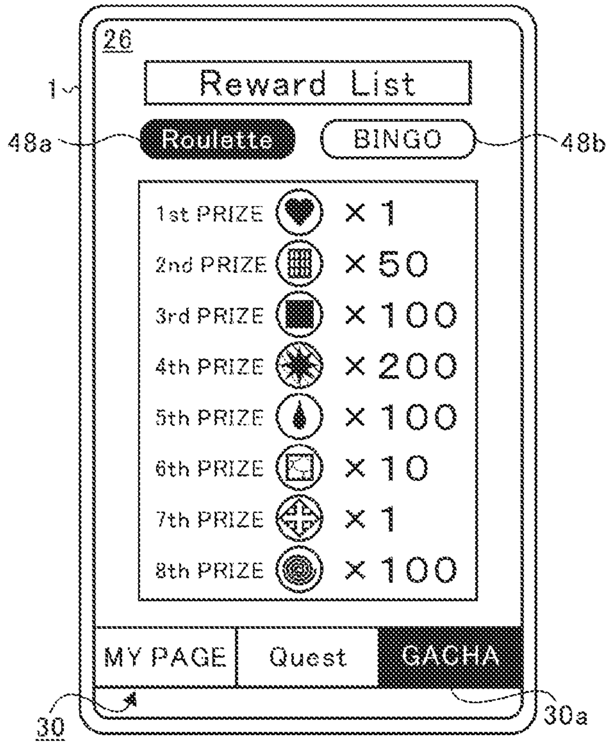
FIG. 3B is a drawing for illustrating an example of a reward list screen.

FIG. 3A is a drawing for illustrating an example of a reward lottery game, and FIG. 3B is a drawing for illustrating an example of a reward list screen. During the game, a menu bar 30 is displayed in a lower section of the display 26. A plurality of selection sections, including a lottery game selection section 30*a*, are provided on the menu bar 30. On the touchscreen, a tap region is set so as to overlap each of the selection sections, so that when a tap region is tapped, the screen on the display 26 switches to the screen corresponding to the tapped selection section. When the lottery game selection section 30*a* is tapped, a reward lottery game screen is displayed, as shown in FIG. 3A. The reward lottery game screen is set on a top screen of the lottery game (hereinafter, referred to as a lottery top screen).

On the reward lottery game screen, a possessed-coin-number display section 32 is displayed in the upper right section of the display 26. The number of possessed coins serving as event-dedicated currency is displayed in the possessed-coin-number display section 32. The player can execute the lottery game once by consuming one coin. Therefore, the player can grasp the number of times the player can execute the lottery game by referring to the number of possessed coins displayed in the possessed-coin-number display section 32.

Here, the lottery game is configured to include two games: the reward lottery game and a special-gift game. In the lottery game, a lottery process for determining one reward that is won among a plurality of rewards is executed once, and the one won reward that has been determined is applied to the reward lottery game and the special-gift game.

A roulette image 34, a reward list tab 36, a lottery start button 38, and a special-gift-sheet display tab 40 are displayed on the reward lottery game screen. The roulette image 34 is an image corresponding to the reward lottery game of the lottery game and includes eight winning regions 34*a* formed by equally dividing a ring-shaped display region into eight regions. Reward images showing rewards that can be won in the lottery process, as well as the classes of the rewards, are shown in the eight winning regions 34*a*. In addition, a ring-shaped decoration region 34*b* is provided outside the winning regions 34*a*.

In addition, on the touchscreen, a tap region is provided on each of the reward list tab 36, the lottery start button 38, and the special-gift-sheet display tab 40. When the reward list tab 36 is tapped, the reward list screen shown in FIG. 3B is displayed. On the reward list screen, rewards that can be won in the lottery process are displayed in an identifiable manner. As shown in FIG. 3B, eight types of rewards are provided in this embodiment, and each of the rewards is assigned a class from the first prize to the eighth prize.

Also, when a lottery request operation (described below) is input after the lottery start button 38 is tapped on the reward lottery game screen, lottery request information is transmitted from the player terminal 1 to the server 100. Upon receiving the lottery request information, the server 100 executes the lottery process for determining one won reward from the eight types of rewards.

FIG. 4 is a drawing for illustrating an example of a reward lottery table. The reward lottery table is stored in the storage unit 118 of the server 100, and upon receiving the lottery request information, the server 100 executes the lottery process by using the reward lottery table. In the reward lottery table, each of the eight types of rewards from a reward A of the first prize to a reward H of the eighth prize is assigned a numeral, and a winning probability for each of the rewards is set as illustrated. As shown in FIG. 4, the winning probability for the reward A of the first prize is set to the smallest value, and the winning probability for the reward H of the eighth prize is set to the largest value in this reward lottery table.

Note that although eight types of rewards are provided here, the number of rewards that can be won in the lottery process can be set as appropriate. In addition, although the plurality of rewards include rewards having different probabilities at which rewards to be won are determined, i.e., the winning probabilities here, the same winning probability may be set to all rewards.

In addition, the player can execute the lottery game repeatedly during an event holding period. Here, only one reward lottery table is provided, and the winning probability for each of the rewards is constant regardless of the number of times the lottery game is executed and the timing at which the lottery game is executed. It should be noted, however, that a plurality of reward lottery tables in which rewards are set to have different winning probabilities may be provided, so that a different reward lottery table can be used depending on the number of times the lottery game is executed or the timing at which the lottery game is executed. If this is the case, the winning probability for each of the rewards can differ depending on the lottery game. In addition, in the case where a plurality of reward lottery tables are provided, some or all of the rewards that can be won may differ depending on the reward lottery table.

As described above, in the lottery game, the lottery process determines that any one of the plurality of provided rewards is a won reward. Also, the won reward is awarded to the player in the reward lottery game, and a presentation for suggesting or reporting the won reward is executed at this time. Note that a presentation regarding the reward lottery game is described below.

Figure 5A:
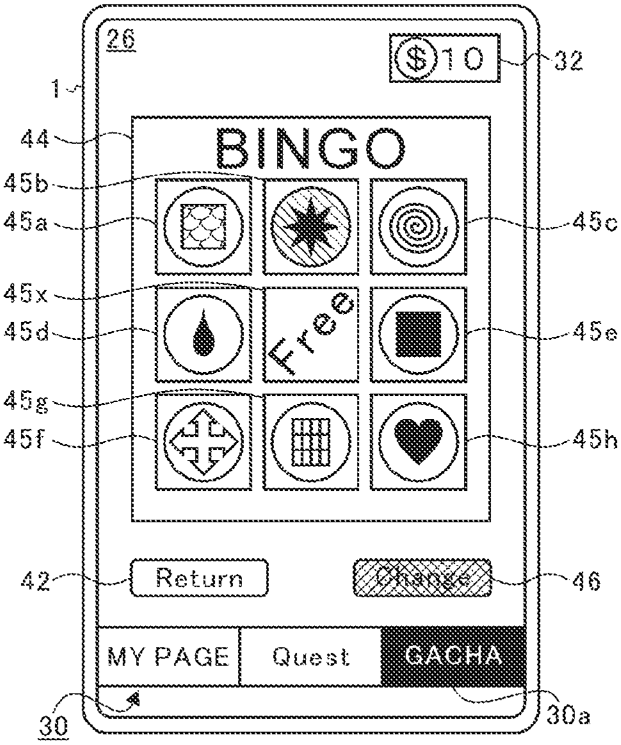
FIG. 5A is a drawing for illustrating an example of a special-gift game.
Figure 5B:
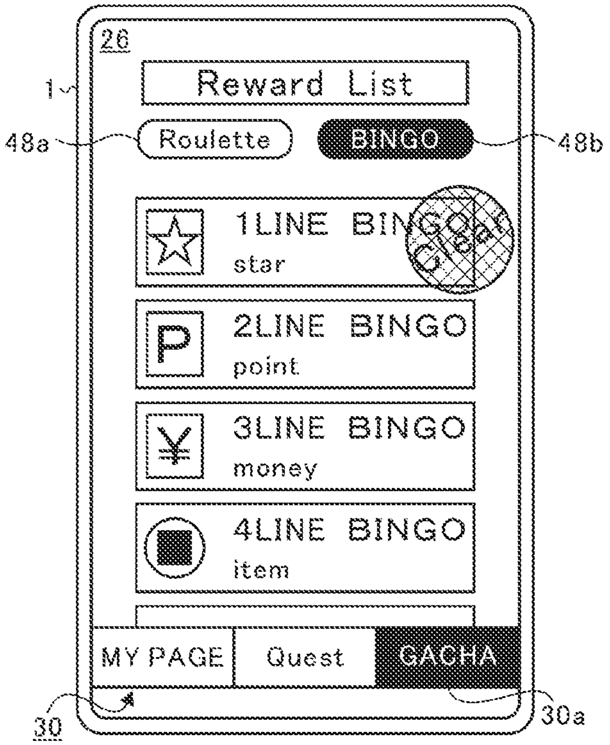
FIG. 5B is a drawing for illustrating an example of a special-gift list screen.

FIG. 5A is a drawing for illustrating an example of the special-gift game, and FIG. 5B is a drawing for illustrating an example of a special-gift list screen. When the special-gift-sheet display tab 40 is tapped on the reward lottery game screen shown in FIG. 3A, a special-gift game screen shown in FIG. 5A is displayed on the display 26. A return tab 42, a special-gift sheet 44, and a sheet exchange button 46 are displayed on the special-gift game screen. On the touchscreen, a tap region is provided on the return tab 42, and when the return tab 42 is tapped, the screen transitions from the special-gift game screen to the reward lottery game screen shown in FIG. 3A.

Eight reward frames 45*a*, 45*b*, 45*c*, 45*d*, 45*e*, 45*f*, 45*g*, and 45*h*, as well as a release frame 45*x*, are displayed on the special-gift sheet 44. Hereinafter, the reward frames 45*a*, 45*b*, 45*c*, 45*d*, 45*e*, 45*f*, 45*g*, and 45*h* are collectively referred to just as reward frames, and the reward frames and the release frame 45*x* are collectively referred to as decision frames. The nine decision frames are arranged in three rows, including the upper row, the middle row, and the lower row in the height direction, and in three columns, including the left column, the middle column, and the right column in the width direction. “Free” is displayed in the release frame 45*x*, which is arranged in the middle row and the middle column of the nine decision frames.

Here, a plurality of the special-gift sheets 44 are provided, and on each of the special-gift sheets 44, one of the eight types of rewards determined by the lottery process is associated with each of the eight reward frames. A reward image showing a reward corresponding to each of the reward frames is displayed on the reward frame.

Note that the rewards associated with the eight reward frames differ for each special-gift sheet 44. In other words, the plurality of special-gift sheets 44 differ from one another in correspondence relationships between reward frames and rewards, i.e., reward arrangement patterns. The player is awarded one special-gift sheet 44 determined by lottery from the plurality of special-gift sheets 44. The player thus possesses the awarded special-gift sheet 44, and the special-gift sheet 44 currently possessed by the player is displayed on the special-gift game screen.

The special-gift game is a so-called Bingo game, and the release frame 45*x* is preset as a gained frame, and the reward frames are preset as ungained frames when the special-gift sheet 44 is distributed. Also, when it is determined by the aforementioned lottery process that the reward associated with a reward frame is a won reward, the reward frame changes from an ungained frame to a gained frame. Also, when three gained frames are arranged along a vertical, horizontal, or oblique straight line on the special-gift sheet 44, one line is established, thus awarding the player a special gift corresponding to the number of established lines.

On the special-gift list screen shown in FIG. 5B, a special gift to be awarded is displayed for each of the number of established lines. A maximum of eight lines are established in the special-gift game, and the player can confirm the special gift awarded when one line is established up to the special gift when eight lines are established by performing a flick operation upward on the special-gift list screen. Note that, on the special-gift list screen, the numbers of lines that have been established on the current special-gift sheet 44, in other words, the special gifts that have been gained by the player, are displayed in an identifiable manner. Here, because the portions corresponding to the numbers of established lines are captioned "Clear", the player can confirm the gained special gifts.

Note that a reward list switch tab 48*a* and a special-gift list switch tab 48*b* are provided on each of the reward list screen shown in FIG. 3B and the special-gift list screen shown in FIG. 5B. The special-gift list screen is displayed when the special-gift list switch tab 48*b* is tapped while the reward list screen appears, and the reward list screen is displayed when the reward list switch tab 48*a* is tapped while the special-gift list screen appears. The reward lottery game screen shown in FIG. 3A is displayed when the display 26 is tapped while the reward list screen or the special-gift list screen appears.

In addition, the special-gift game has a sheet exchange condition preset therein, so that the player can exchange the special-gift sheet 44 when the sheet exchange condition is established. Here, establishing three lines on the special-gift sheet 44 is set as the sheet exchange condition. Although a tap region is provided on the sheet exchange button 46 on the touchscreen, the sheet exchange button 46 is disabled if three lines are not established. If the sheet exchange condition is not established, the sheet exchange button 46 is grayed out, as shown in FIG. 5A.

On the other hand, when three lines are established on the special-gift sheet 44 and the sheet exchange condition is established, the sheet exchange button 46 is enabled. The player can exchange the special-gift sheet 44 by tapping the sheet exchange button 46 in an enabled state.

FIG. 6 is a drawing for illustrating an example of a sheet lottery table. The storage unit 118 of the server 100 stores the sheet lottery table, and upon receiving sheet request information, the server 100 executes a sheet determination process by using the sheet lottery table. As described above, the special-gift game is provided with a plurality of special-gift sheets 44 having reward arrangement patterns that are different from one another. In the sheet lottery table, each of the special-gift sheets 44 is assigned a numeral, so that each of the special-gift sheets 44 has a determination probability set therefor. Here, for example, 20 patterns of special-gift sheets 44 are provided, and the determination probabilities of all the special-gift sheets 44 are set to 5%. It should be noted, however, that the number of special-gift sheets 44 and the determination probabilities are not particularly limited.

For example, only one type of special-gift sheet 44 may be provided, so that the same special-gift sheet 44 can be reset when the sheet exchange condition is established. In addition, for example, the player may be capable of selecting a desired special-gift sheet 44, instead of determining a special-gift sheet 44 by lottery. Furthermore, although only one special-gift sheet 44 can be possessed here, a plurality of special-gift sheets 44 may be possessed at the same time. Moreover, although a special-gift sheet 44 is awarded to the player for free here, the player may be allowed to possess a special-gift sheet 44 in exchange for in-game currency or an item. Also, although rewards common among all special-gift sheets 44 are arranged here, rewards that differ for each of the special-gift sheets 44 may be arranged. If this is the case, for example, rewards that can be won in the reward lottery game may be changed as a result of the special-gift sheet 44 being exchanged. Furthermore, although common special gifts are always awarded regardless of the number of times the special-gift sheet 44 is exchanged here, it is also acceptable that special gifts to be awarded differ depending on the number of times the special-gift sheet 44 is exchanged.

FIG. 7A is a drawing for illustrating the decision frames. FIG. 7B is a drawing for illustrating an example of the correspondence relationships between reward frames and rewards. FIG. 7C is a drawing for illustrating reward arrangement patterns for each of the special-gift sheets 44. As shown in FIG. 7A, the special-gift sheet 44 is provided with the reward frames 45*a* to 45*h* and the release frame 45*x*. In addition, in this embodiment, rewards A to H are provided as rewards that are determined to be won rewards by the lottery process of the lottery game.

As shown in FIGS. 7B and 7C, any one of the rewards A to H is associated with each of the reward frames 45*a* to 45*h* on the special-gift sheet 44. More specifically, an arrangement pattern in which reward frames are associated with rewards is set in each of the plurality of special-gift sheets 44. For example, on the special-gift sheet 44 having an arrangement pattern a, the reward H is associated with the reward frame 45*a*, the reward E is associated with the reward frame 45*b*, the reward D is associated with the reward frame 45*c*, the reward F is associated with the reward frame 45*d*, the reward C is associated with the reward frame 45*e*, the reward A is associated with the reward frame 45*f*, the reward B is associated with the reward frame 45*g*, and the reward G is associated with the reward frame 45*h*.

Therefore, the arrangement of rewards is as shown in FIG. 7B on the special-gift sheet 44 having the arrangement pattern a. An arrangement pattern is preset for each of the special-gift sheets 44, and at least one of the correspondence relationships between reward frames and rewards differs among all special-gift sheets 44, i.e., arrangement patterns.

Figures 8A, 8B:
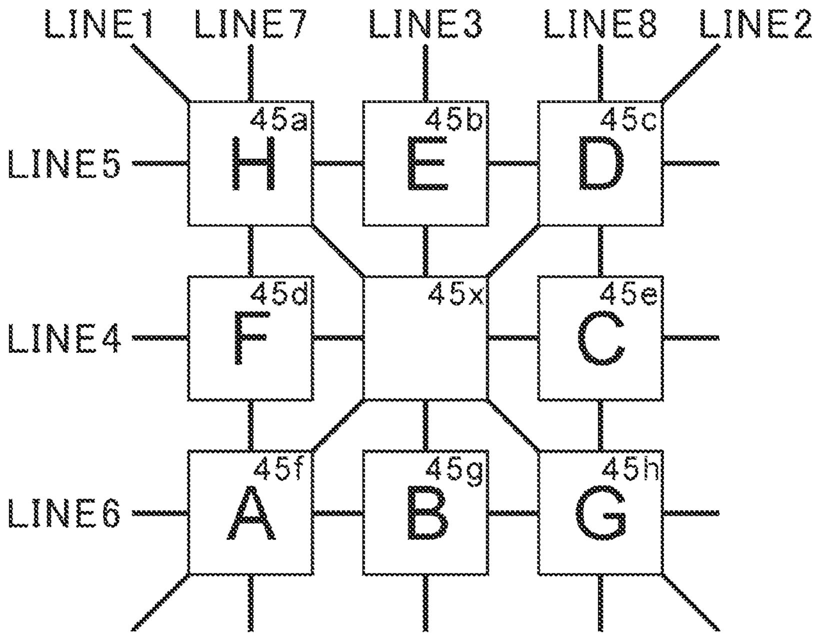
FIG. 8A is a drawing for illustrating lines.
FIG. 8B is a drawing for illustrating reward groups.

FIG. 8A is a drawing for illustrating lines. FIG. 8B is a drawing for illustrating reward groups. As shown in FIG. 8A, three decision frames are arranged along each of the vertical, horizontal, and oblique straight lines on the special-gift sheet 44. Also, a first line connecting the reward frames 45*a* and 45*h* and the release frame 45*x*; a second line connecting the reward frames 45*c* and 45*f* and the release frame 45*x*; a third line connecting the reward frames 45*b* and 45*g* and the release frame 45*x*; a fourth line connecting the reward frames 45*d* and 45*e* and the release frame 45*x*; a fifth line connecting the reward frames 45*a*, 45*b*, and 45*c*; a sixth line connecting the reward frames 45*f*, 45*g*, and 45*h*; a seventh line connecting the reward frames 45*a*, 45*d*, and 45*f*; and an eighth line connecting the reward frames 45*c*, 45*e*, and 45*h* are formed on the special-gift sheet 44.

Regarding the first to eighth lines described above, when all three decision frames on a line are gained frames, the line is decided as being an established line. Therefore, for example, on the special-gift sheet 44 having the arrangement pattern a shown in FIG. 8A, when the rewards H and G are determined to be won rewards, the first line becomes an established line, and when the rewards A, B, and G are determined to be won rewards, the sixth line becomes an established line.

Here, reward group information for defining a plurality of reward groups, in addition to the arrangement pattern, is associated with the special-gift sheet 44. As shown in FIG. 8B, a reward group is configured by combining a plurality of rewards, and, for example, the eight reward groups shown in FIG. 8B are set to the special-gift sheet 44 having the arrangement pattern a. The reward group of No. 1 shown in FIG. 8B is configured from a combination of the two rewards H and G. Similarly, the reward group of No. 2 is configured from a combination of the rewards A and D, the reward group of No. 3 is configured from a combination of the rewards B and E, and the reward group of No. 4 is configured from a combination of the rewards C and F.

Furthermore, the reward group of No. 5 is configured from a combination of the rewards D, E, and H, the reward group of No. 6 is configured from a combination of the rewards A, B, and G, the reward group of No. 7 is configured from a combination of the rewards A, F, and H, and the reward group of No. 8 is configured from a combination of the rewards C, D, and G. Here, the reward group numbers shown in FIG. 8B coincide with the line numbers shown in FIG. 8A.

As described above, the special-gift sheet 44 is provided with not only an arrangement pattern for displaying rewards in the reward frames but also reward group information in which multiple (eight here) reward groups are defined. In the special-gift game, a reward determined to be a won reward is stored, so that a reward group in which the number of rewards determined to be won rewards has reached a predetermined number (2 or 3 here) is decided as being an achieved reward group. In more detail, when all rewards constituting one reward group are determined to be won rewards, this reward group is decided as being an achieved reward group. Therefore, the number of achieved reward groups coincide with the number of established lines.

Reward group information is provided for each of the special-gift sheets 44 and is used to decide whether or not there is an achieved reward group. On the basis of this decision, a special gift corresponding to the number of achieved reward groups is awarded to the player. Note that the special-gift sheet 44 can be changed on condition that the number of achieved reward groups has reached a preset particular number (3 here). Because changing the special-gift sheet 44 also causes the reward group information to be changed, it can be considered that reward group information can be changed on condition that the number of achieved reward groups has reached the particular number.

It is assumed here that a reward group is decided as being an achieved reward group when all rewards constituting that reward group are determined to be won rewards. It should be noted, however, that in the case where, for example, five decision frames are arranged on a straight line, one reward group is composed of a maximum of five rewards. In this case, for example, when four of the five rewards constituting one reward group are determined to be won rewards, the reward group may be decided as being an achieved reward group.

In addition, here, the special-gift sheet 44 can be changed on condition that the number of achieved reward groups has reached three, which is the preset particular number. Moreover, eight reward groups are defined in one item of reward group information. Therefore, the particular number is smaller than the number of reward groups defined in one item of reward group information. That is, the player can exchange the special-gift sheet 44 in a state in which not all eight lines are established. It should be noted, however, that the particular number may be set to, for example, eight, so that the special-gift sheet 44 can be changed when all reward groups are decided as being achieved reward groups. If this is the case, all eight types of rewards need to be determined to be won rewards.

Next, presentations in the lottery game will be described.

Figure 9A:
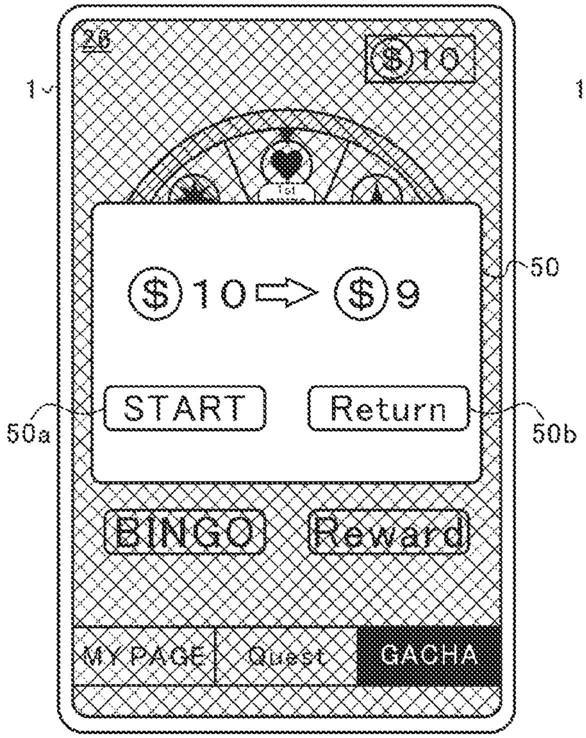
FIG. 9A is a drawing for illustrating an example of a presentation of a lottery game.
Figure 9B:
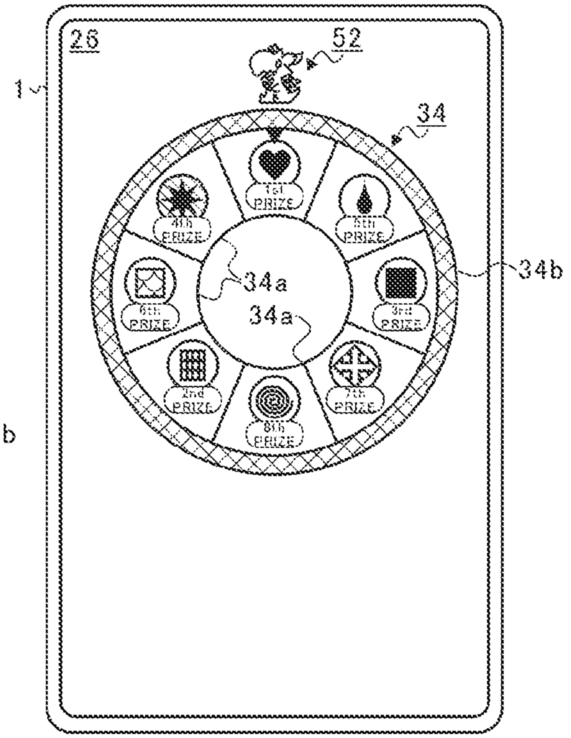
FIG. 9B is a drawing for illustrating an example of a presentation when the reward lottery game is started.
Figure 9C:
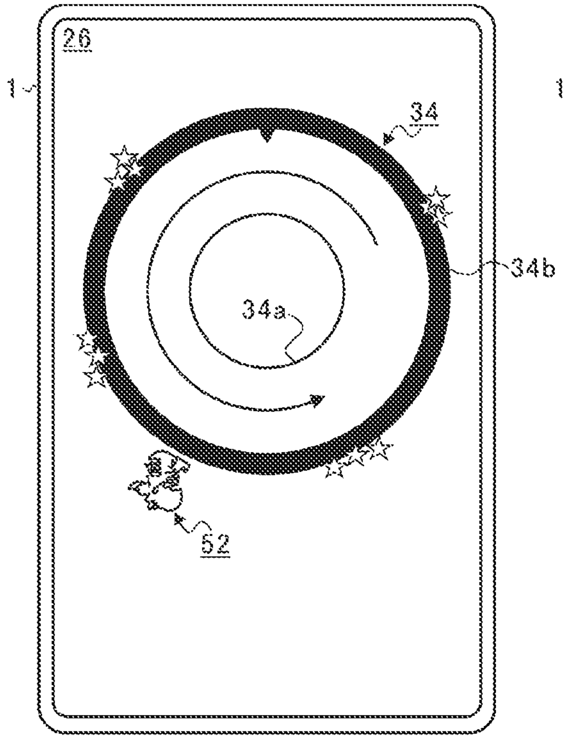
FIG. 9C is a drawing for illustrating a suggestion presentation.
Figure 9D:
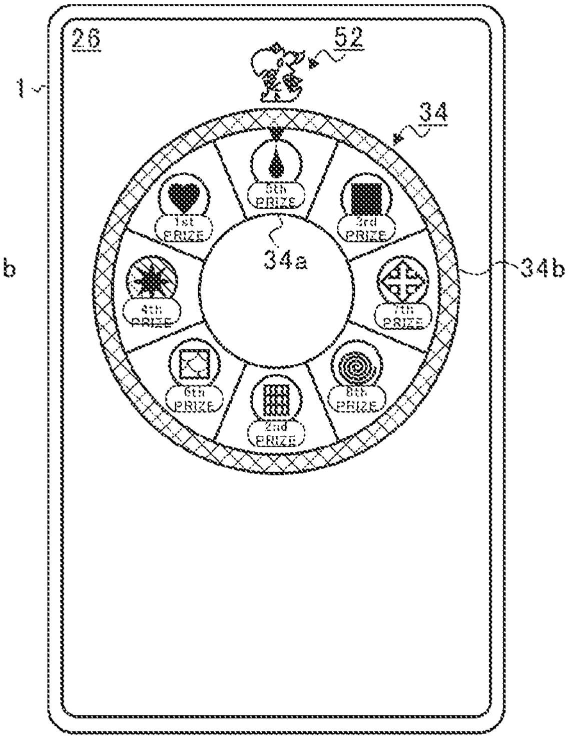
FIG. 9D is a drawing for illustrating an example of a presentation when the reward lottery game is ended.

FIG. 9A is a drawing for illustrating an example of a presentation of the lottery game. FIG. 9B is a drawing for illustrating an example of a presentation when the reward lottery game is started. FIG. 9C is a drawing for illustrating a suggestion presentation. FIG. 9D is a drawing for illustrating an example of a presentation when the reward lottery game is ended. When the lottery start button 38 is tapped on the reward lottery game screen shown in FIG. 3A, a start confirmation pop-up 50 is displayed on the reward lottery game screen, as shown in FIG. 9A. It is reported in the start confirmation pop-up 50 that a possessed coin is consumed. In addition, a start button 50*a* and a return button 50*b* are displayed in the start confirmation pop-up 50.

On the touchscreen, a tap region is provided on the start button 50*a* and the return button 50*b*. When the return button 50*b* is tapped, the start confirmation pop-up 50 is hidden. In addition, when the start button 50*a* is tapped (lottery request operation is input), lottery request information is transmitted from the player terminal 1 to the server 100, and the lottery process is executed in the server 100.

Although a detailed description is omitted, the start button 50*a* is disabled if the number of possessed coins needed for the lottery game is insufficient, preventing the player from inputting a lottery request operation. It should be noted, however, that the lottery request information may be transmitted to the server 100 when the start button 50*a* is tapped, regardless of the number of possessed coins, so that it can be decided in the server 100 whether or not coins needed for the lottery game are possessed. In this case, when it is decided in the server 100 that the number of possessed coins needed for the lottery game is insufficient, it suffices if the player terminal 1 receives information indicating that the lottery game cannot be executed and the player is notified that the lottery game is not executed.

Also, when the player terminal 1 receives, from the server 100, a result of the lottery process, i.e., reward lottery result information indicating a won reward, a roulette presentation is started, as shown in FIG. 9B.

In the roulette presentation, the roulette image 34 described above and a character 52 are displayed. Also, in the roulette image 34, the winning regions 34*a* rotate in the arrow direction in the figure, as shown in FIG. 9C, and thereafter, the winning regions 34*a* stop rotating, as shown in FIG. 9D. At this time, the pointer shown in an upper section of the roulette image 34 points at a winning region 34*a* showing the reward image of the won reward. In this manner, the won reward is reported to the player by the roulette presentation.

In addition, a suggestion presentation is executed during the roulette presentation, i.e., during the time period from when the winning regions 34*a* start rotating to when the winning regions 34*a* stop rotating. The suggestion presentation includes a first suggestion presentation and a second suggestion presentation. The first suggestion presentation is a presentation for suggesting a won reward, and the second suggestion presentation is a presentation for suggesting the number of established lines in the special-gift game.

In the first suggestion presentation, an image of, for example, the character 52 running around the decoration region 34*b* is displayed. At this time, a plurality of execution patterns (five patterns, here) of the first suggestion presentation are provided, so that behavior of the character 52 differs for each of the execution patterns.

In the second suggestion presentation, the manner for displaying, for example, the decoration region 34*b* changes. At this time, a plurality of execution patterns (four patterns, here) of the second suggestion presentation are provided, so that the manner for displaying the decoration region 34*b* differs for each of the execution patterns.

FIG. 10A is a drawing for illustrating an example of a first-suggestion-presentation determination table. FIG. 10B is a drawing for illustrating an example of a second-suggestion-presentation determination table. The storage unit 18 of the player terminal 1 stores the first-suggestion-presentation determination table and the second-suggestion-presentation determination table. Upon receiving reward lottery result information, the player terminal 1 determines an execution pattern of the first suggestion presentation by using the first-suggestion-presentation determination table.

In the first-suggestion-presentation determination table, selection ratios among the five execution patterns from A to E are set for each of the eight types of rewards. For example, in the case where the reward A has been determined to be a won reward, the execution pattern A, the execution pattern B, the execution pattern C, the execution pattern D, and the execution pattern E will be selected as the execution pattern of the first suggestion presentation at probabilities of 5%, 10%, 15%, 30%, and 40%, respectively. Furthermore, for example, in the case where the reward H has been determined to be a won reward, the execution pattern A, the execution pattern B or C, and the execution pattern D will be selected as the execution pattern of the first suggestion presentation at probabilities of 40%, 25%, and 10%, respectively.

According to this first-suggestion-presentation determination table, for example, it is possible that the execution pattern E is selected only when the reward A has been determined to be a won reward. Therefore, executing the suggestion presentation of the execution pattern E suggests to the player that the reward A of the first prize has been won. In addition, for example, the execution pattern A of the first suggestion presentation has a higher selection ratio as the class becomes lower. Therefore, when the first suggestion presentation is executed in the execution pattern A, it is suggested that a reward of a lower class has likely been won.

In addition, when the lottery process is executed in the server 100, a line decision process for deciding the number of lines to be simultaneously established with this won reward is executed on the basis of the reward group information. The player terminal 1 receives line decision information indicating the result of the line decision process, together with the reward lottery result information. Upon receiving the line decision information, the player terminal 1 determines an execution pattern of the second suggestion presentation by using the second-suggestion-presentation determination table.

In the second-suggestion-presentation determination table, selection ratios among the four execution patterns of the second suggestion presentation are set for each of the numbers of lines that are simultaneously established. The four execution patterns of the second suggestion presentation correspond to "blinking", "red", "purple", and "rainbow", respectively, as the manners for displaying the decoration region 34*b*. For example, in the case where the number of lines that are simultaneously established is 0, "blinking" is always determined to be the execution pattern of the second suggestion presentation. Also, for example, in the case where the number of lines that are simultaneously established is 3, "blinking", "red", "purple", or "rainbow" is determined as the execution pattern of the second suggestion presentation at probabilities of 10%, 20%, 30%, or 40%, respectively.

In the example shown in FIG. 10B, "rainbow" is selected only in the case where three lines are simultaneously established. Therefore, display of the decoration region 34*b* in the rainbow color suggests that three lines have been simultaneously established. Thus, in the second suggestion presentation, the number of established lines is suggested by the manner for displaying the decoration region 34*b*. In other words, in the second suggestion presentation, it is suggested whether or not the number of rewards determined to be won rewards has reached the predetermined number specified in any of the achieved reward groups. Note that although the execution pattern of the second suggestion presentation is determined on the basis of the number of established lines here, the execution pattern of the second suggestion presentation may be determined on the basis of whether or not there is an established line, instead of the number of lines.

Figure 11A:
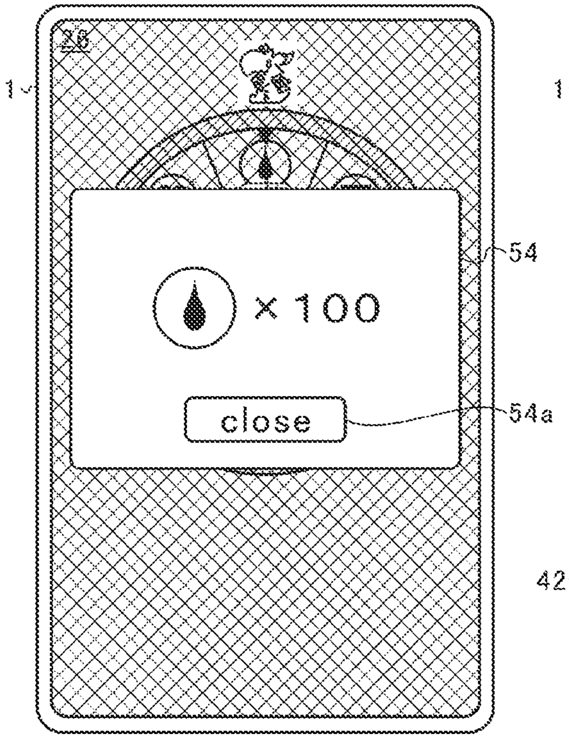
FIG. 11A is a drawing for illustrating an example of a won-reward report screen.
Figure 11B:
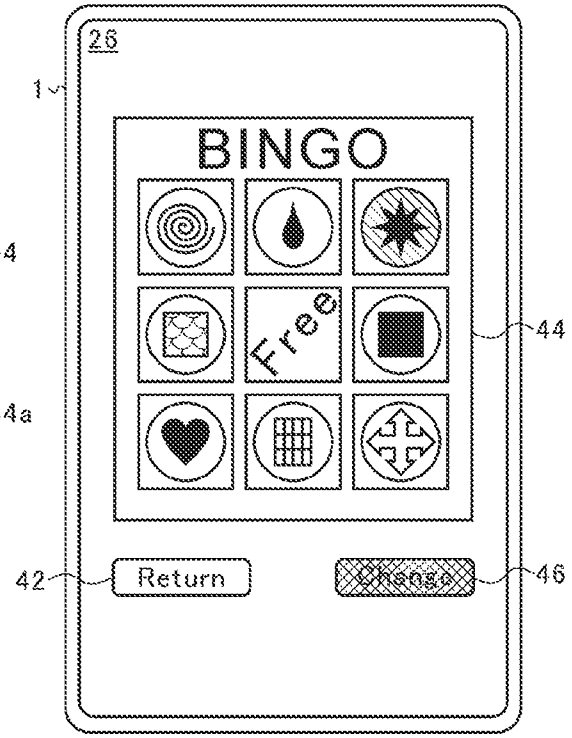
FIG. 11B is a first drawing for illustrating an example of a presentation of the special-gift game.
Figure 11C:
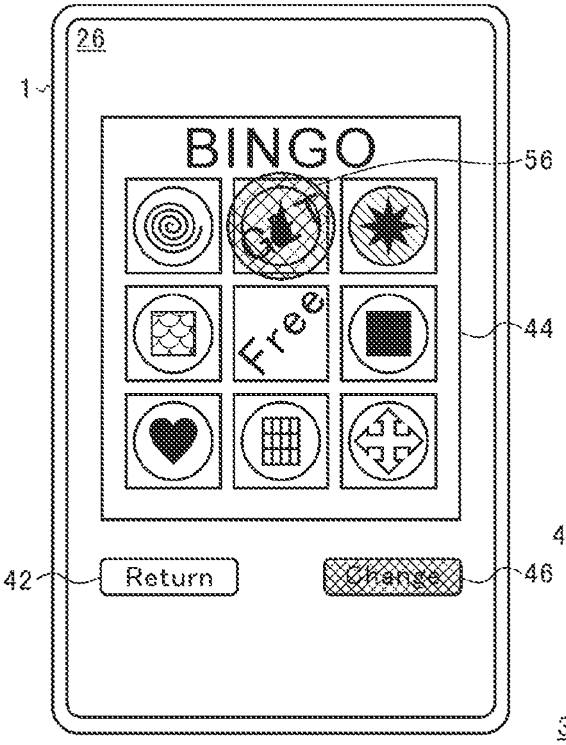
FIG. 11C is a second drawing for illustrating an example of a presentation of the special-gift game.
Figure 11D:
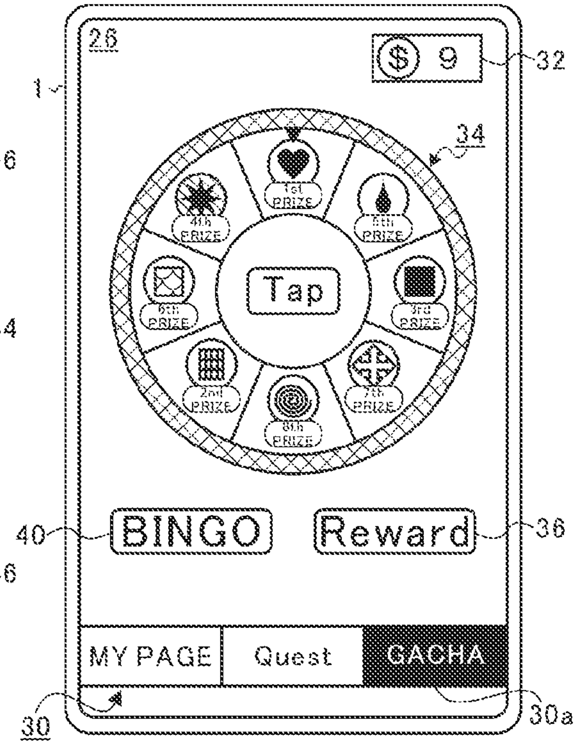
FIG. 11D is a drawing for illustrating an example of a top screen of the lottery game.

FIG. 11A is a drawing for illustrating an example of a won-reward report screen. FIG. 11B is a first drawing for illustrating an example of a presentation of the special-gift game. FIG. 11C is a second drawing for illustrating an example of a presentation of the special-gift game. FIG. 11D is a drawing for illustrating an example of the top screen of the lottery game. When the roulette presentation ends as a result of the winning regions 34*a* in the roulette image 34 stopping rotating, as shown in FIG. 9D, the won-reward report screen shown in FIG. 11A is displayed. A won reward pop-up 54 for reporting a won reward is displayed on the won-reward report screen. In addition, a close button 54*a* is provided in the won reward pop-up 54. On the touchscreen, a tap region is provided on the close button 54*a*, so that when the close button 54*a* is tapped, the won reward pop-up 54, i.e., the won-reward report screen, is hidden.

As a result of the won-reward report screen being hidden, a presentation regarding the reward lottery game, i.e., the reward lottery game, ends, causing a presentation regarding the special-gift game to start. When the close button 54*a* is tapped, the special-gift sheet 44 currently possessed by the player is displayed, as shown in FIG. 11B. Also, in the case where the reward frame of the reward that has been determined to be a won reward is an ungained frame, a gained-frame report presentation is executed, as shown in FIG. 11C. In the gained-frame report presentation, a gained-frame identification image 56 captioned "GET" is superimposed on the reward frame that has been updated from an ungained frame to a gained frame.

Note that the return tab 42 and the sheet exchange button 46 are displayed on the display 26, together with the special-gift sheet 44. In the example shown in FIG. 11C, the sheet exchange button 46 is disabled because the sheet exchange condition is not established. Also, when the return tab 42 is tapped, the special-gift game ends, causing the top screen of the lottery game to be displayed as shown in FIG. 11D.

Figure 12A:
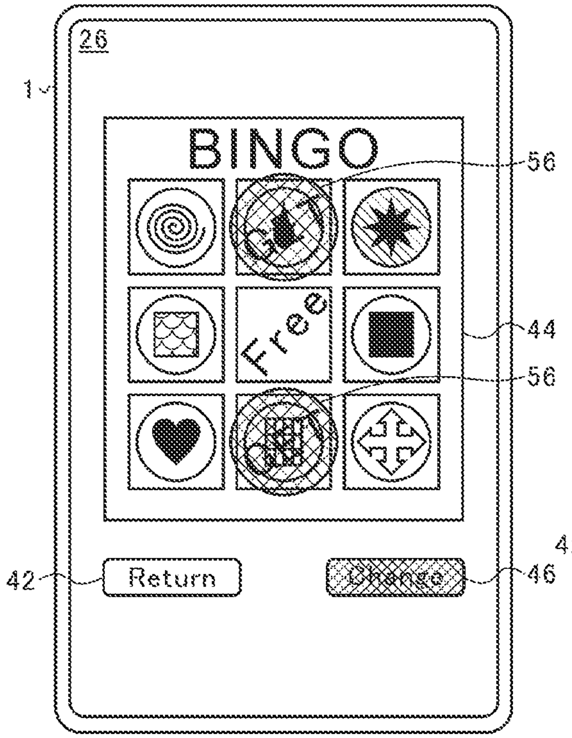
FIG. 12A is a third drawing for illustrating an example of a presentation of the special-gift game.
Figure 12B:
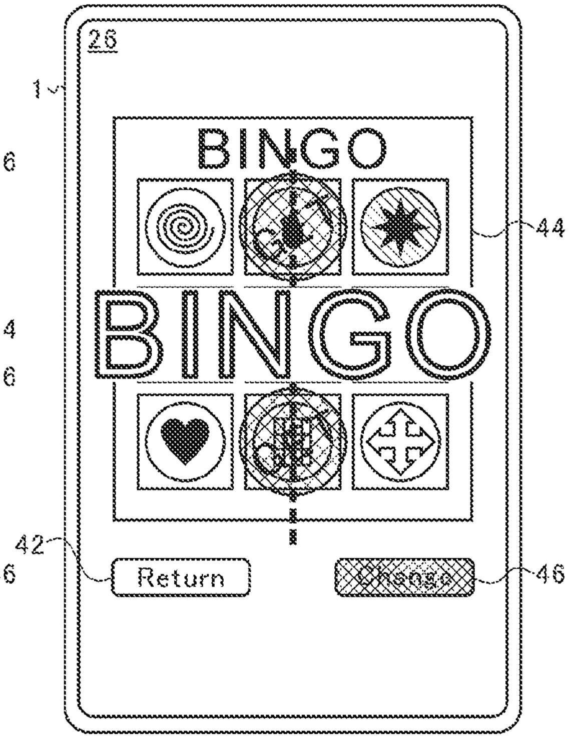
FIG. 12B is a fourth drawing for illustrating an example of a presentation of the special-gift game.
Figure 12C:
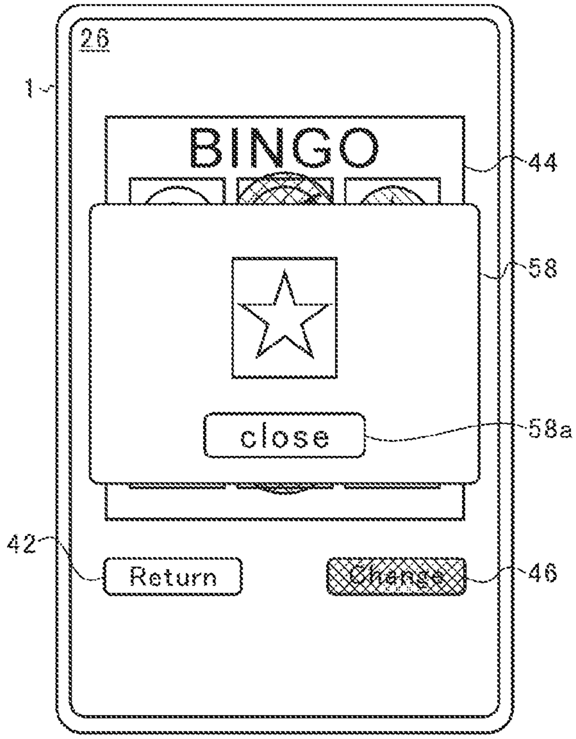
FIG. 12C is a drawing for illustrating an example of a gained-special-gift report screen.

FIG. 12A is a third drawing for illustrating an example of a presentation of the special-gift game. FIG. 12B is a fourth drawing for illustrating an example of a presentation of the special-gift game. FIG. 12C is a drawing for illustrating an example of a gained-special-gift report screen. As described above, it is assumed that the first lottery game has ended as a result of the return tab 42 being tapped in the state shown in FIG. 11C, causing the top screen of the lottery game shown in FIG. 11D to be displayed. It is also assumed that, thereafter, a second lottery game has been executed during an event holding period, and the reward lottery game has ended in the same manner as described above.

It is further assumed that the reward frame of the reward determined to be a won reward in the second lottery game is an ungained frame, and the gained-frame report presentation has been executed, as shown in FIG. 12A. In the example shown in FIG. 12A, the third line is newly established. Thus, when a new line is established, not only is the established line identifiably displayed, as shown in FIG. 12B, but also the player is informed that a new line has been established.

Thereafter, the gained-special-gift report screen is displayed, as shown in FIG. 12C. A gained-special-gift pop-up 58 for reporting a special gift to be awarded to the player is displayed on the gained-special-gift report screen. Furthermore, a close button 58*a* is provided in the gained-special-gift pop-up 58. On the touchscreen, a tap region is provided on the close button 58*a*, so that when the close button 58*a* is tapped, the gained-special-gift pop-up 58 is hidden, thereby placing the screen into the state shown in FIG. 12A.

Figure 13A:
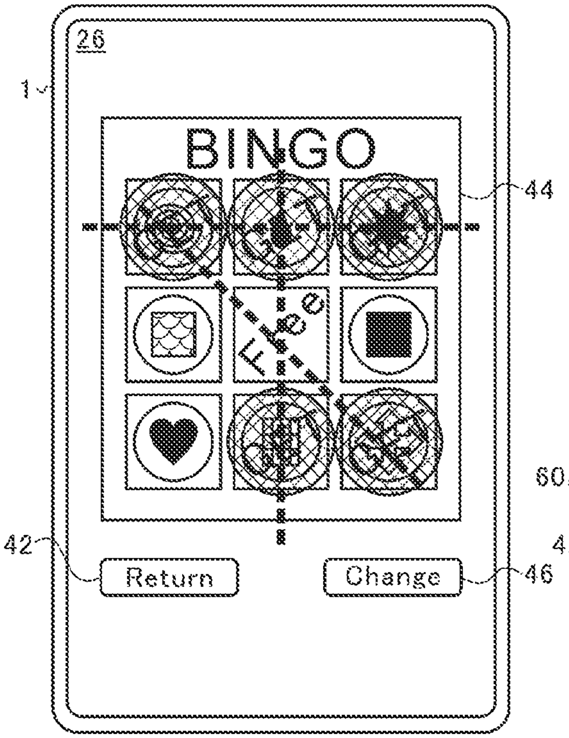
FIG. 13A is a fifth drawing for illustrating an example of a presentation of the special-gift game.
Figure 13B:
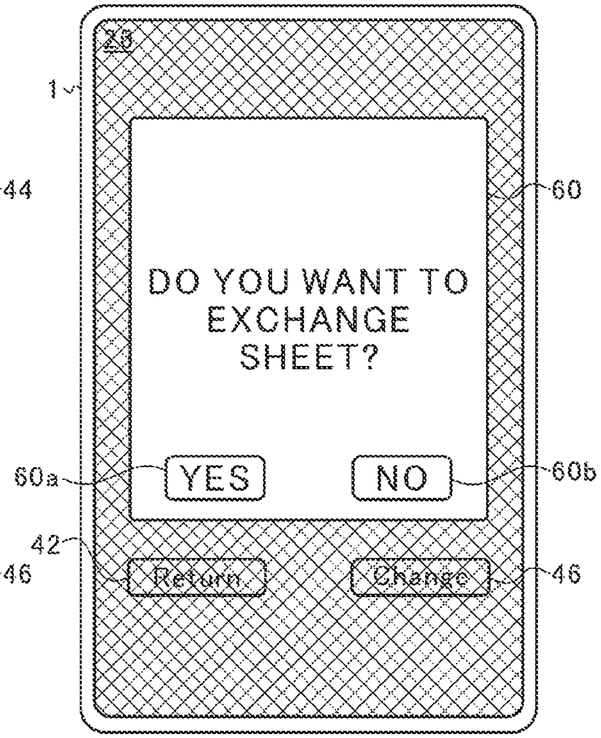
FIG. 13B is a drawing for illustrating an example of a first sheet exchange screen.
Figure 13C:
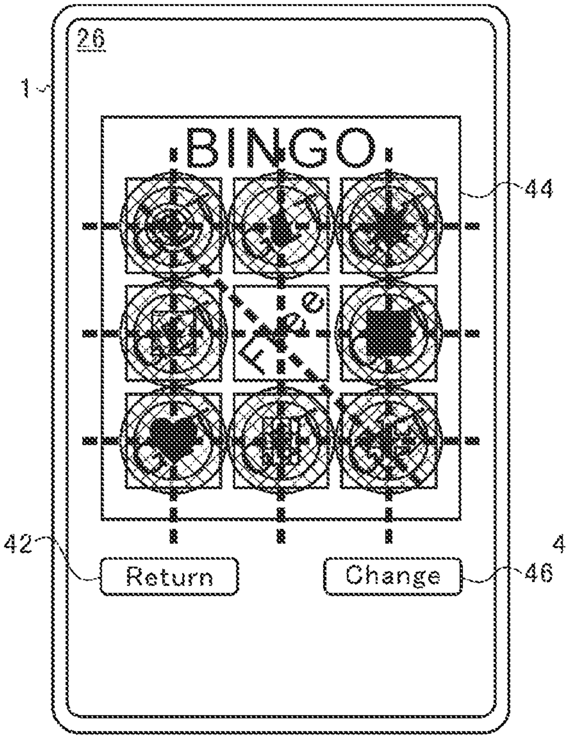
FIG. 13C is a sixth drawing for illustrating an example of a presentation of the special-gift game.
Figure 13D:
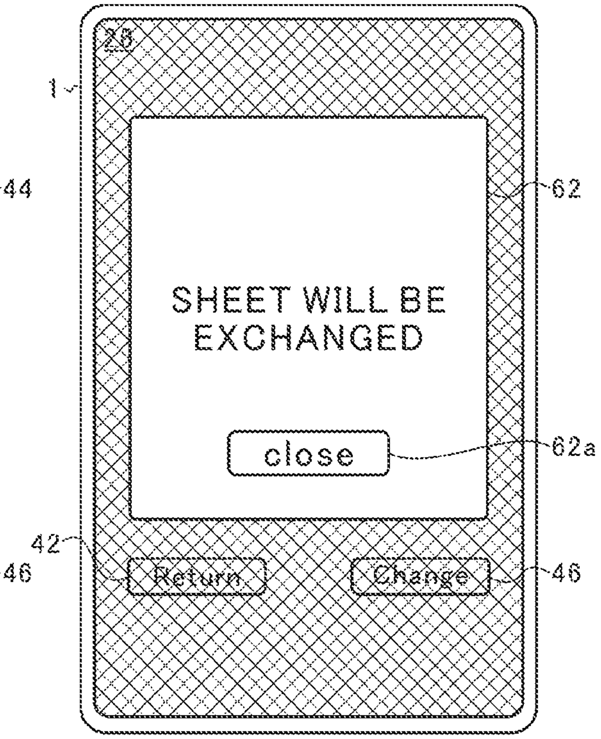
FIG. 13D is a drawing for illustrating an example of a second sheet exchange screen.

FIG. 13A is a fifth drawing for illustrating an example of a presentation of the special-gift game. FIG. 13B is a drawing for illustrating an example of a first sheet exchange screen. FIG. 13C is a sixth drawing for illustrating an example of a presentation of the special-gift game. FIG. 13D is a drawing for illustrating an example of a second sheet exchange screen. As shown in FIG. 13A, when three lines are established through a plurality of lottery games (i.e., special-gift games), the sheet exchange button 46 is enabled. Also, when the enabled sheet exchange button 46 is tapped, the first sheet exchange screen is displayed, as shown in FIG. 13B.

On the first sheet exchange screen, an exchange confirmation pop-up 60 is displayed. In the exchange confirmation pop-up 60, a message for confirming whether or not to exchange the special-gift sheet 44 is displayed. In addition, a determination button 60*a* and a cancel button 60*b* are provided in the exchange confirmation pop-up 60. On the touchscreen, a tap region is provided on the determination button 60*a* and the cancel button 60*b*, so that when the determination button 60*a* is tapped, the sheet request information is transmitted from the player terminal 1 to the server 100. Upon receiving the sheet request information, the server 100 executes the sheet determination process by using the sheet lottery table. This completes exchange of the special-gift sheet 44. Note that when the cancel button 60*b* is tapped, the exchange confirmation pop-up 60 is hidden, thereby placing the screen into the state shown in FIG. 13A.

In addition, when it is reported that eight lines have been established through a plurality of lottery games (i.e., special-gift games) as shown in FIG. 13C, the screen is forced to display the second sheet exchange screen shown in FIG. 13D. An exchange report pop-up 62 is displayed on the second sheet exchange screen. A message reporting that the special-gift sheet 44 is exchanged is displayed in the exchange report pop-up 62. Although described below in detail, the special-gift sheet 44 is exchanged at the server 100 at the time the number of established lines has reached a maximum number.

In addition, a close button 62*a* is provided in the exchange report pop-up 62. On the touchscreen, a tap region is provided on the close button 62*a*, so that when the close button 62*a* is tapped, the exchange report pop-up 62 is hidden, thereby returning the screen to the state shown in FIG. 13C.

As described above, according to the lottery game of this embodiment, one won reward is determined by the lottery process. Also, the lottery game includes the reward lottery game and the special-gift game. In the reward lottery game, not only is a won reward awarded to the player but also a presentation for suggesting and reporting the won reward is executed. In addition, in the special-gift game, the number of achieved reward groups, i.e., the number of established lines, is decided on the basis of a won reward that is common with the reward lottery game, and a special gift is awarded to the player on the basis of the number of achieved reward groups (established lines).

Thus, in the lottery game, one won reward is commonly applied both to the reward lottery game and the special-gift game. For this reason, even if a reward of a low class is determined to be a won reward, there is a possibility that the player is awarded a special gift when a line is established, which enhances the player's motivation to participate in the lottery game.

In addition, there can be a case where, for example, a reward of a higher class, such as a rare item, has been gained, but a reward of a lower rarity and a lower class has not been gained, resulting in a small number of lines being established. In such a case, the player is required to determine whether to aim at winning a reward of a lower class by prioritizing establishing lines (i.e., by prioritizing gaining a special gift) or to aim at gaining a reward of a higher class by giving up a special gift and exchanging the special-gift sheet 44. Thus, this embodiment requires the player not only to gain a reward but also to formulate a strategy, which enhances the fun of the lottery game.

Furthermore, in contrast to the above case, there can be a case where no rewards of a higher class have been gained, but many rewards of a lower class have been gained, resulting in many established lines. In such a case, it may be a good idea for the player, for example, to exchange the special-gift sheets 44 one after another by giving up a reward of a higher class, if a special gift that can be gained by establishing a line is more beneficial to the player than a reward of a higher class.

In a conventional lottery game, or a so-called box gacha, it is possible to reset the box or transition to another box by winning an item, etc. with a lower winning probability and a higher rarity. In contrast, according to this embodiment, it is possible to exchange the special-gift sheet 44 without gaining a reward of a higher class, thus providing new fun that would not be possible with a conventional box gacha.

Next, functional configurations of the player terminal 1 and the server 100 for executing the aforementioned lottery game will be described. Note that functional configurations regarding the lottery game will be described here, and descriptions of the other configurations will be omitted.

(Functional Configuration of Player Terminal 1)

Figure 14:
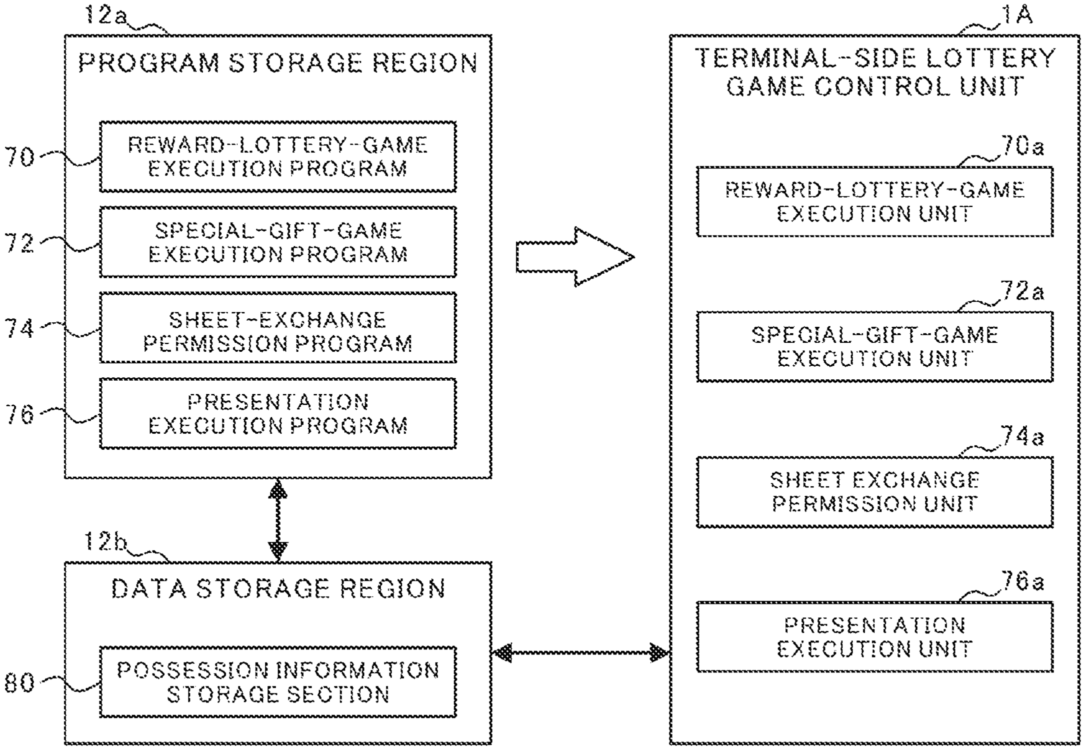
FIG. 14 is a drawing for illustrating the configuration of the memory in the player terminal and functions of the player terminal as a computer.

FIG. 14 is a diagram for illustrating the configuration of the memory 12 in the player terminal 1 and the functions of the player terminal 1 as a computer. In the memory 12, a program storage region 12*a* and a data storage region 12*b* are provided. When a game is started, the CPU 10 reads out terminal-side lottery game programs (modules) and lottery game tables stored in the storage unit 18 and stores these programs and tables in the program storage region 12*a*.

The terminal-side lottery game programs include a reward-lottery-game execution program 70, a special-gift-game execution program 72, a sheet-exchange permission program 74, and a presentation execution program 76. Note that the programs listed in FIG. 14 are examples, and a large number of other programs are also provided in the player terminal 1. Also, the data storage region 12*b* includes, as a storage section for storing data, a possession information storage section 80. Note that a large number of other storage sections are provided in the data storage region 12*b*.

The CPU 10 runs the individual programs stored in the program storage region 12*a* and updates the data in the individual storage sections of the data storage region 12*b*. Furthermore, the CPU 10 runs the terminal-side lottery game programs stored in the program storage region 12*a*, thereby causing the player terminal 1 to function as a terminal-side lottery game control unit 1A. The terminal-side lottery game control unit 1A includes a reward-lottery-game execution unit 70*a*, a special-gift-game execution unit 72*a*, a sheet exchange permission unit 74*a* (permission unit), and a presentation execution unit 76*a* (presentation execution unit).

More specifically, the CPU 10 runs the reward-lottery-game execution program 70, thereby causing the computer to function as the reward-lottery-game execution unit 70*a*. Similarly, the CPU 10 runs the special-gift-game execution program 72, the sheet-exchange permission program 74, and the presentation execution program 76, thereby causing the computer to function as the special-gift-game execution unit 72*a*, the sheet exchange permission unit 74*a*, and the presentation execution unit 76*a*, respectively.

The reward-lottery-game execution unit 70*a* controls execution of the reward lottery game.

The special-gift-game execution unit 72*a* controls execution of the special-gift game.

The sheet exchange permission unit 74*a* decides whether or not a sheet exchange condition has been established, thereby enabling or disabling the sheet exchange button 46.

The presentation execution unit 76*a* determines the execution patterns of the first suggestion presentation and the second suggestion presentation by using the first-suggestion-presentation determination table and the second-suggestion-presentation determination table, and executes the first suggestion presentation and the second suggestion presentation in the determined execution patterns.

The possession information storage section 80 stores the special-gift sheets 44, as well as items, characters, etc. serving as rewards and special gifts.

(Functional Configuration of Server 100)

Figure 15:
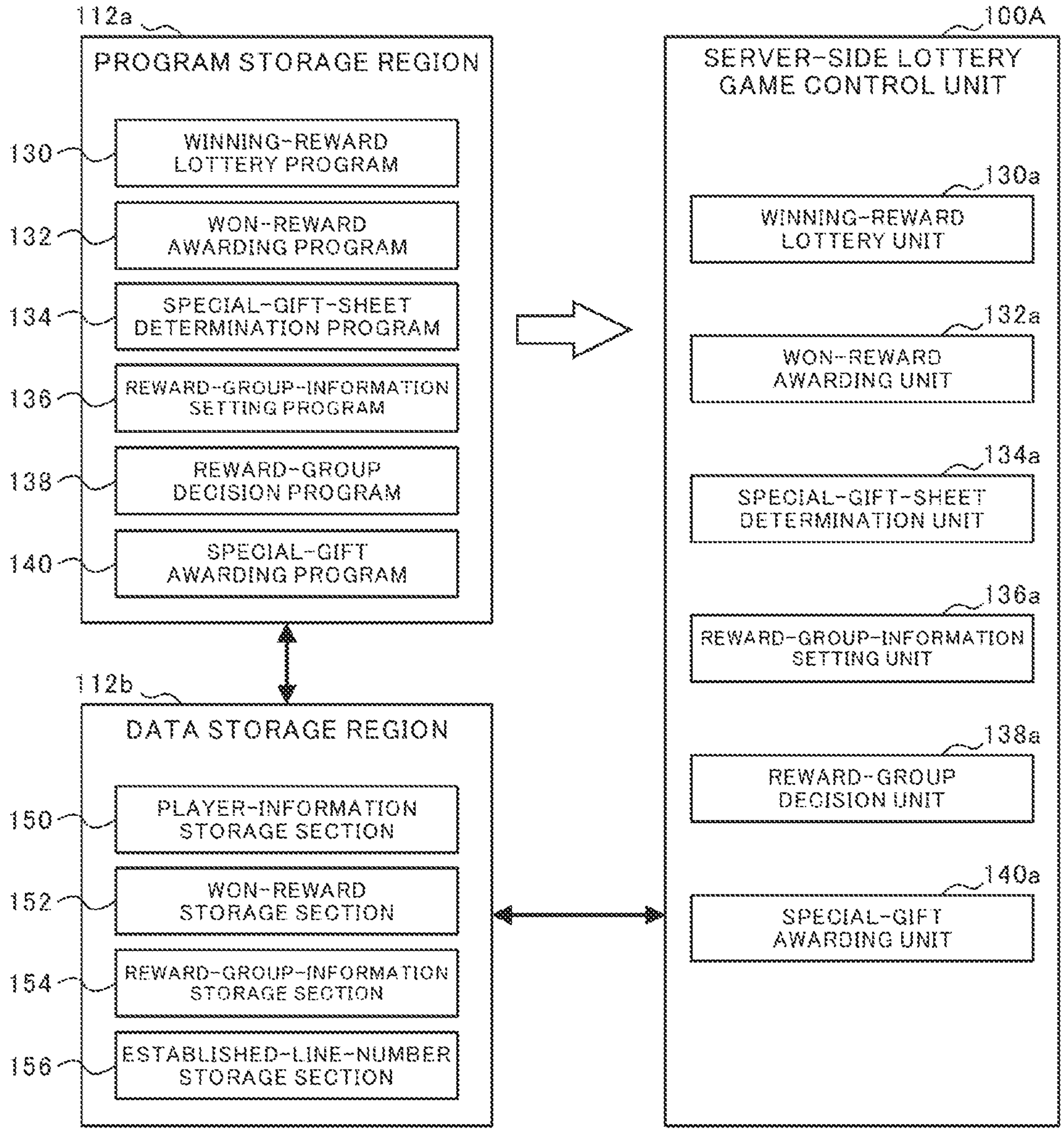
FIG. 15 is a drawing for illustrating the configuration of the memory in the server and functions of the server as a computer.

FIG. 15 is a diagram for illustrating the configuration of the memory 112 in the server 100 and functions of the server 100 as a computer. The memory 112 includes a program storage region 112*a* and a data storage region 112*b*. The CPU 110 stores server-side lottery game programs (modules) in the program storage region 112*a*.

The server-side lottery game programs include a winning-reward lottery program 130, a won-reward awarding program 132, a special-gift-sheet determination program 134, a reward-group-information setting program 136, a reward-group decision program 138, and a special-gift awarding program 140. Note that the programs listed in FIG. 15 are examples, and a large number of other programs are also provided.

The data storage region 112*b* includes, as storage sections for storing data, a player-information storage section 150, a won-reward storage section 152, a reward-group-information storage section 154, and an established-line-number storage section 156. Note that these storage sections are examples, and a large number of other storage sections are provided in the data storage region 112*b*.

The CPU 110 runs the individual programs stored in the program storage region 112*a* and updates the data in the individual storage sections of the data storage region 112*b*. Also, the CPU 110 runs the programs stored in the program storage region 112*a*, thereby causing the server 100 to function as a server-side lottery game control unit 100A. The server-side lottery game control unit 100A includes a winning-reward lottery unit 130*a* (determination unit), a won-reward awarding unit 132*a* (awarding unit), a special-gift-sheet determination unit 134*a*, a reward-group-information setting unit 136*a* (setting unit), a reward-group decision unit 138*a* (decision unit), and a special-gift awarding unit 140*a* (special-gift awarding unit).

More specifically, the CPU 110 runs the winning-reward lottery program 130, thereby causing the computer to function as the winning-reward lottery unit 130*a*. Similarly, the CPU 110 runs the won-reward awarding program 132, the special-gift-sheet determination program 134, the reward-group-information setting program 136, the reward-group decision program 138, and the special-gift awarding program 140, thereby causing the computer to function as the won-reward awarding unit 132*a*, the special-gift-sheet determination unit 134*a*, the reward-group-information setting unit 136*a*, the reward-group decision unit 138*a*, and the special-gift awarding unit 140*a*, respectively.

Upon receiving lottery request information, the winning-reward lottery unit 130*a* executes the lottery process by using the reward lottery table and determines a won reward. In addition, the winning-reward lottery unit 130*a* stores the determined won reward in the won-reward storage section 152.

The won-reward awarding unit 132*a* stores, in the player-information storage section 150, the reward determined to be a won reward by the lottery process. As a result of the reward determined to be a won reward being stored in the player-information storage section 150, the won reward is awarded to the player.

Upon receiving sheet request information, the special-gift-sheet determination unit 134*a* executes the sheet determination process by using the sheet lottery table and determines a special-gift sheet 44.

The reward-group-information setting unit 136*a* sets the reward group information corresponding to the determined special-gift sheet 44 to the reward-group-information storage section 154.

The reward-group decision unit 138*a* decides, on the basis of the reward group information stored in the reward-group-information storage section 154 and the won rewards stored in the won-reward storage section 152, that a reward group in which the number of rewards determined to be won rewards has reached the predetermined number is an achieved reward group. In addition, the reward-group decision unit 138*a* stores the number of achieved reward groups in the established-line-number storage section 156.

The special-gift awarding unit 140*a* stores, in the player-information storage section 150, a special gift corresponding to the number of achieved reward groups. As a result of the special gift being stored in the player-information storage section 150, the special gift is awarded to the player.

(Control Processing in Player Terminal 1 and Server 100)

Next, control processing regarding the aforementioned lottery game executed in the player terminal 1 and the server 100 will be described. Note that control processing regarding the lottery game will be described here, and descriptions of the other control processing will be omitted.

Figure 16:
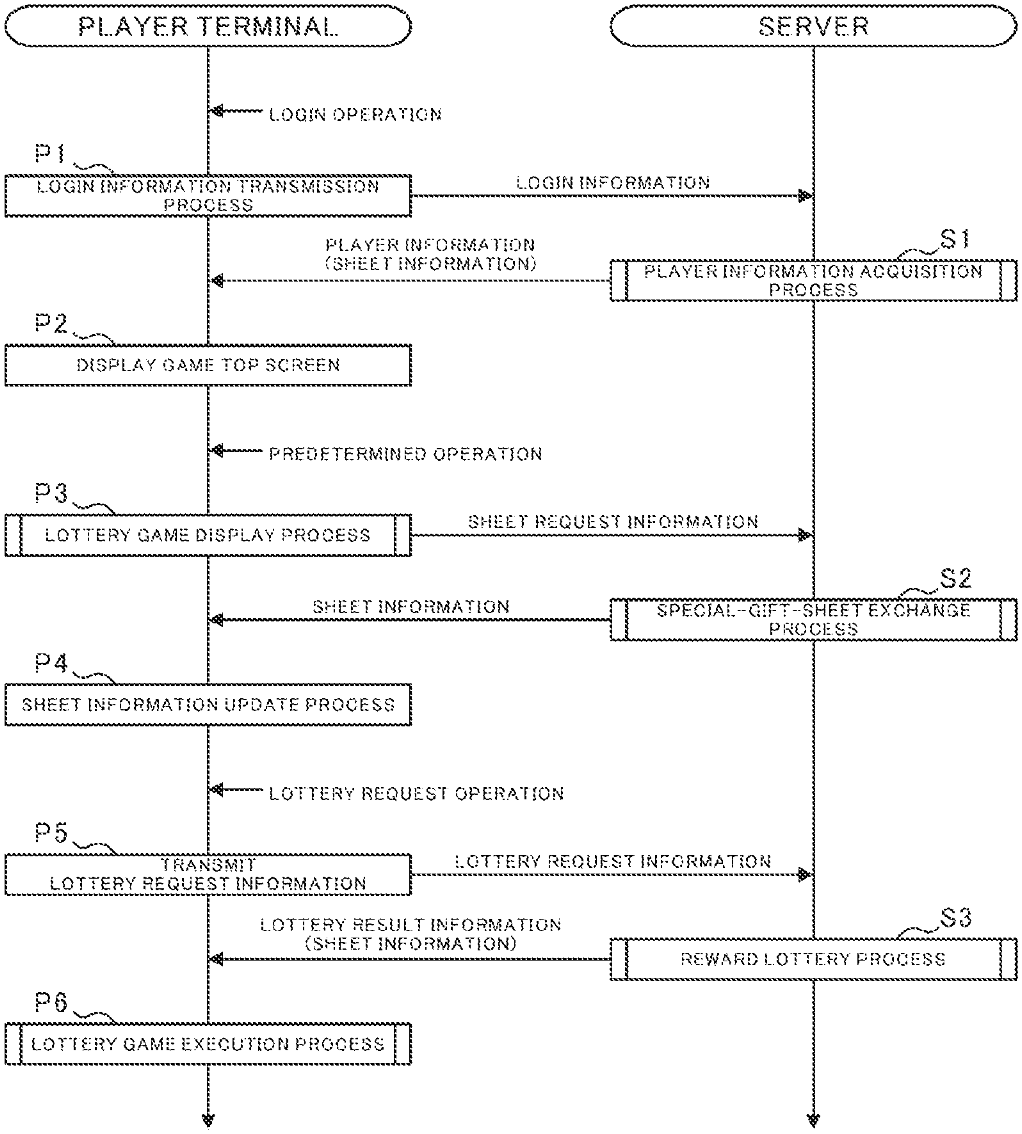
FIG. 16 is a sequence diagram for illustrating basic processing of the player terminal and the server.

FIG. 16 is a sequence diagram for illustrating basic processes of the player terminal 1 and the server 100. When a login operation is input by the player, the player terminal 1 executes a login information transmission process (P1). In this login information transmission process, login information indicating the player's login operation is transmitted to the server 100. Upon receiving the login information, the server 100 executes a player information acquisition process (S1).

Figure 17:
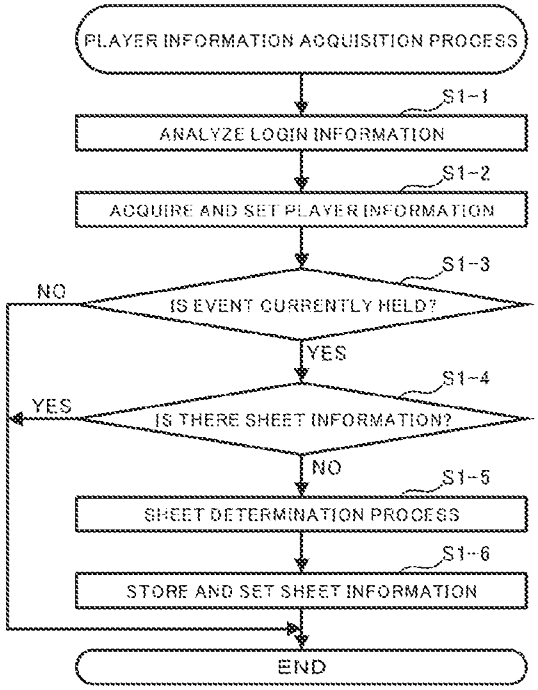
FIG. 17 is a flowchart for illustrating a player information acquisition process in the server.

FIG. 17 is a flowchart for illustrating the player information acquisition process in the server 100. The server 100 analyzes the received login information (S1-1). In addition, the server 100 acquires player information from the storage unit 118 on the basis of the result of analysis of the login information and sets the player information so as to be receivable by the player terminal 1 (S1-2). Furthermore, the server 100 decides whether or not an event is currently held (S1-3). If an event is held (YES in S1-3), it is decided whether or not sheet information corresponding to a special-gift sheet 44 is stored in the player-information storage section 150, i.e., whether or not the player possesses a special-gift sheet 44 (S1-4). Note that the sheet information includes the type of the special-gift sheet 44 and information that allows identification as to whether reward frames are gained frames or ungained frames.

If no sheet information is stored in the player-information storage section 150 (NO in S1-4), the special-gift-sheet determination unit 134*a* executes the sheet determination process for determining any of the special-gift sheets 44 by using the sheet lottery table (S1-5). Also, the special-gift-sheet determination unit 134*a* stores, in the player-information storage section 150, the sheet information corresponding to the special-gift sheet 44 determined in the sheet determination process and sets the sheet information so as to be receivable by the player terminal 1 (S1-6).

According to the aforementioned player information acquisition process, a special-gift sheet 44 that is used in the special-gift game the first time the player performs a login operation during an event holding period is determined and is awarded to the player. It is assumed here that any one of the plurality of special-gift sheets 44 is determined the first time the player performs a login operation during an event holding period. It should be noted, however, that the special-gift sheet 44 that is first awarded to the player may be common among all players. Furthermore, the special-gift sheet 44 that is first awarded to the player may be common with or different from a special-gift sheet 44 that can be exchanged as a result of the sheet exchange condition being established.

Referring back to FIG. 16, upon receiving the player information, the player terminal 1 stores the received player information in the possession information storage section 80 and displays the game top screen on the display 26 (P2). In addition, when a predetermined operation is input during the game, a lottery game display process (P3) for displaying a screen of the lottery game is executed.

Figure 18:
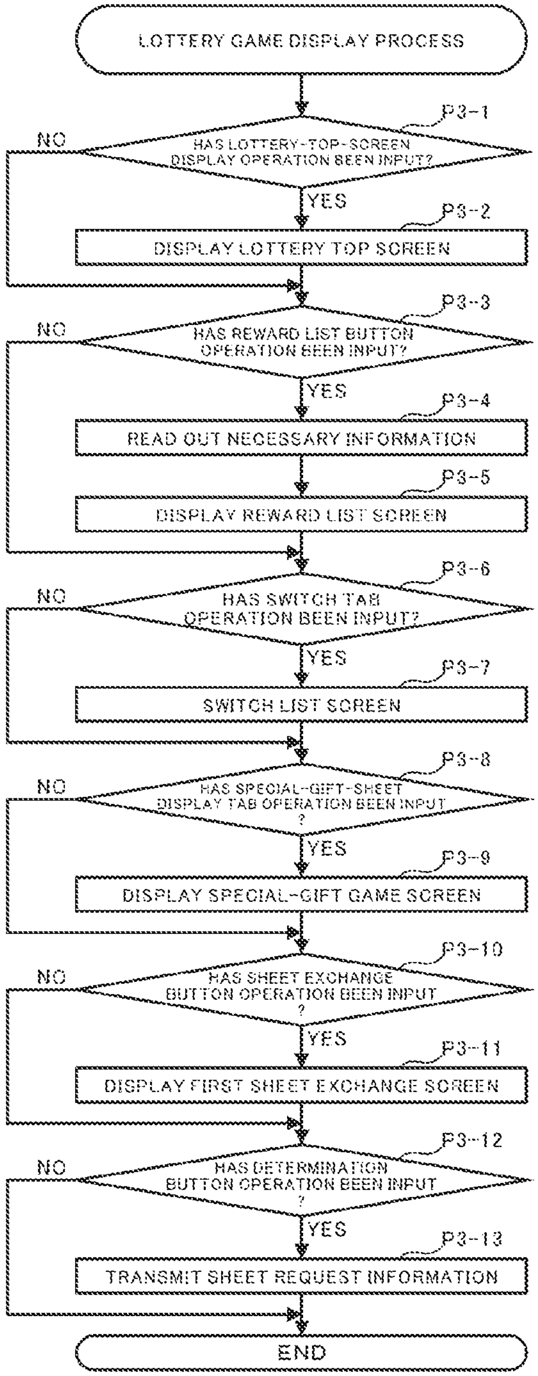
FIG. 18 is a flowchart for illustrating a lottery game display process in the player terminal.

FIG. 18 is a flowchart for illustrating the lottery game display process in the player terminal 1. Here, processes regarding display of some of the aforementioned game screens displayed in the lottery game display process will be described. When a lottery-top-screen display operation for displaying the lottery top screen is input (P3-1), the terminal-side lottery game control unit 1A displays the lottery top screen on the display 26 (P3-2). Note that the lottery-top-screen display operation includes, for example, a tap operation on the lottery game selection section 30*a* in the menu bar 30, a tap operation on the display 26 while the reward list screen or the special-gift list screen is displayed, and a tap operation on the return tab 42.

In addition, when the reward list tab 36 is tapped (YES in P3-3), the terminal-side lottery game control unit 1A reads out necessary information from the possession information storage section 80 (P3-4) and displays the reward list screen (P3-5). Furthermore, when the reward list switch tab 48*a* or the special-gift list switch tab 48*b* is tapped (YES in P3-6), the terminal-side lottery game control unit 1A switches the display between the reward list screen and the special-gift list screen (P3-7).

In addition, when the special-gift-sheet display tab 40 is tapped (YES in P3-8), the terminal-side lottery game control unit 1A displays the special-gift game screen (P3-9). At this time, the sheet exchange permission unit 74*a* decides whether or not the number of established lines is three or more, and enables the sheet exchange button 46 if the number of established lines is three or more or disables the sheet exchange button 46 if the number of established lines is less than three. On the basis of the determination made by the sheet exchange permission unit 74*a* as to whether the sheet exchange button 46 has been enabled or disabled, the terminal-side lottery game control unit 1A determines the manner for displaying the sheet exchange button 46.

In addition, when the enabled sheet exchange button 46 is tapped (YES in P3-10), the terminal-side lottery game control unit 1A displays the first sheet exchange screen, i.e., the exchange confirmation pop-up 60 (P3-11).

In addition, when the determination button 60*a* is tapped (YES in P3-12), the terminal-side lottery game control unit 1A transmits sheet request information to the server 100 (P3-13).

Referring back to FIG. 16, when the sheet request information transmitted in the lottery game display process is received (P3), a special-gift-sheet exchange process is executed in the server 100 (S2).

Figure 19:
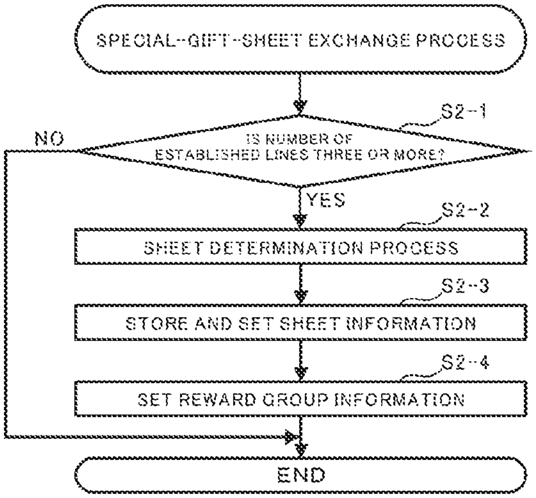
FIG. 19 is a flowchart for illustrating a special-gift-sheet exchange process in the server.

FIG. 19 is a flowchart for illustrating the special-gift-sheet exchange process in the server 100. The special-gift-sheet determination unit 134*a* decides whether or not the number of established lines stored in the established-line-number storage section 156 is three or more (S2-1). If the number of established lines is three or more, the special-gift-sheet determination unit 134*a* executes the sheet determination process for determining one special-gift sheet 44 by lottery by using the sheet lottery table (S2-2). Also, the special-gift-sheet determination unit 134*a* stores, in the player-information storage section 150, the sheet information corresponding to the special-gift sheet 44 determined in the sheet determination process (S2-3). Also, here, the sheet information is set so as to be receivable by the player terminal 1.

Furthermore, the reward-group-information setting unit 136*a* sets and stores, in the reward-group-information storage section 154, the reward group information corresponding to the newly determined special-gift sheet 44 (S2-4). Note that, here, the reward-group-information setting unit 136*a* resets the number of established lines stored in the established-line-number storage section 156.

Referring back to FIG. 16, when the player terminal 1 receives the sheet information, the terminal-side lottery game control unit 1A updates the sheet information stored in the possession information storage section 80 (P4). In addition, when the start button 50*a* is tapped and the lottery request operation is input, lottery request information is transmitted from the player terminal 1 to the server 100 (P5). When the lottery request information is received, a reward lottery process is executed in the server 100 (S3).

Figure 20:
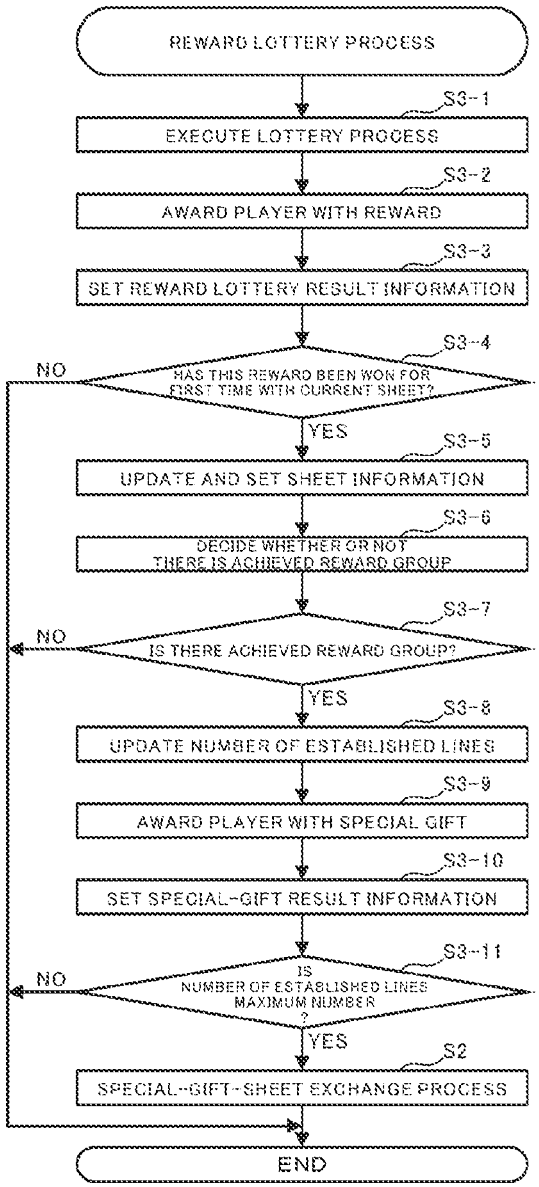
FIG. 20 is a flowchart for illustrating a reward lottery process in the server.

FIG. 20 is a flowchart for illustrating the reward lottery process in the server 100. The winning-reward lottery unit 130*a* executes the lottery process by using the reward lottery table and determines a won reward (S3-1). Also, here, the winning-reward lottery unit 130*a* stores, in the won-reward storage section 152, information indicating the won reward. More specifically, in the server 100, the won rewards that have been won in the reward lottery game since the current special-gift sheet 44 was set are stored. That is, the won rewards that have been gained are associated with the current special-gift sheet 44. Also, the won-reward awarding unit 132*a* awards the player with the reward determined to be a won reward (S3-2). More specifically, the won-reward awarding unit 132*a* stores the reward awarded to the player in the player-information storage section 150. In addition, the winning-reward lottery unit 130*a* sets lottery result information (here, reward lottery result information indicating the won reward) so as to be receivable by the player terminal 1 (S3-3).

Moreover, the reward-group decision unit 138*a* decides whether the won reward determined in the lottery process has never been won, i.e., has been won for the first time, since the current special-gift sheet 44 was possessed (S3-4). If the won reward determined in the lottery process has been won for the first time, the reward-group decision unit 138*a* updates the sheet information on the basis of the reward group information (S3-5). Here, the reward-group decision unit 138*a* updates, to a gained frame, the reward frame corresponding to the reward determined to be a won reward and sets the updated sheet information so as to be receivable by the player terminal 1.

In addition, the reward-group decision unit 138*a* decides whether or not there is a new achieved reward group on the basis of the won reward and the reward group information (S3-6). If there is a new achieved reward group (YES in S3-7), the reward-group decision unit 138*a* updates the number of established lines in the established-line-number storage section 156 (S3-8). In addition, the special-gift awarding unit 140*a* awards the player the special gift corresponding to the number of established lines (S3-9). Here, the special-gift awarding unit 140*a* stores, in the player-information storage section 150, the special gift corresponding to the number of established lines.

Note that, for example, in the case where the number of established lines is six as a result of three lines being simultaneously established in a state in which the number of established lines is three, three types of special gifts corresponding to four, five, and six respective established lines are awarded to the player. Also, the special-gift awarding unit 140*a* sets the lottery result information (here, special-gift result information indicating special gifts awarded to the player) so as to be receivable by the player terminal 1 (S3-10).

Furthermore, the special-gift-sheet determination unit 134*a* decides whether or not the number of established lines is the maximum number (eight here) (S3-11), and executes the same special-gift-sheet exchange process (S2) described above if the number of established lines is the maximum number (YES in S3-11).

Referring back to FIG. 16, when the lottery result information (reward lottery result information, special-gift result information, sheet information) is received, a lottery game execution process is executed in the player terminal 1 (P6).

Figure 21:
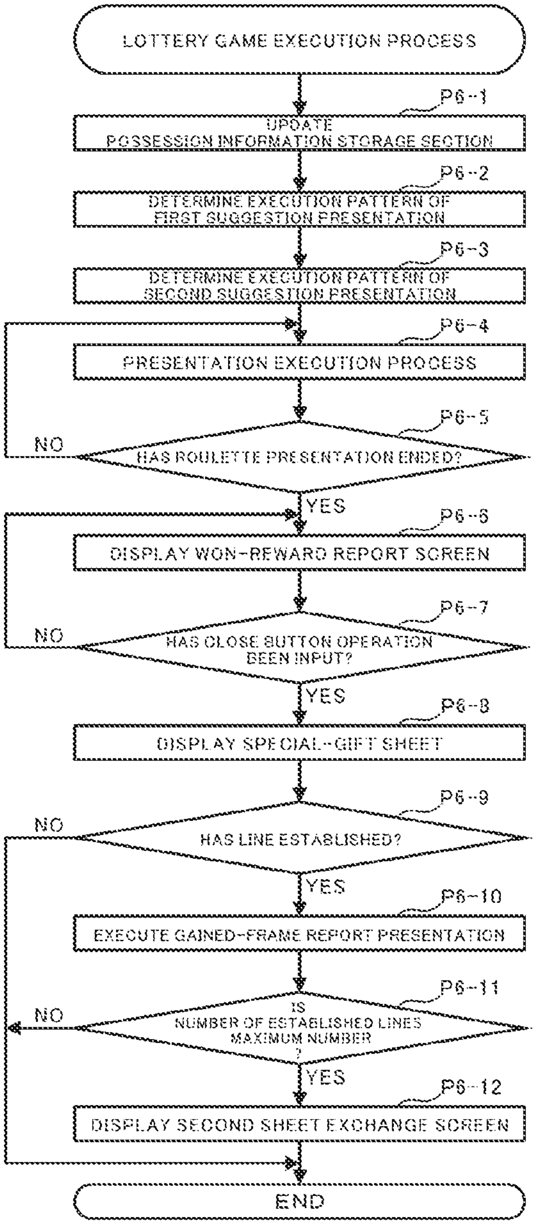
FIG. 21 is a flowchart for illustrating a lottery game execution process in the player terminal.

FIG. 21 is a flowchart for illustrating the lottery game execution process in the player terminal 1. The reward-lottery-game execution unit 70*a* updates the possession information storage section 80 on the basis of the received lottery result information (P6-1). Also, the presentation execution unit 76*a* determines the execution pattern of the first suggestion presentation by using the first-suggestion-presentation determination table on the basis of the reward lottery result information (P6-2). Furthermore, the presentation execution unit 76*a* determines the execution pattern of the second suggestion presentation by using the second-suggestion-presentation determination table on the basis of the reward lottery result information and the sheet information (P6-3).

The presentation execution unit 76*a* executes a presentation execution process for executing the roulette presentation, the first suggestion presentation, and the second suggestion presentation (P6-4). Also, when the roulette presentation ends (YES in P6-5), the special-gift-game execution unit 72*a* displays the won-reward report screen, i.e., the won reward pop-up 54 (P6-6). Furthermore, when the close button 54*a* is tapped (YES in P6-7), the special-gift-game execution unit 72*a* displays the special-gift sheet 44 (P6-8). Also, if a new line is established (YES in P6-9), the special-gift-game execution unit 72*a* executes the gained-frame report presentation (P6-10). Furthermore, if the number of established lines is the maximum number (YES in P6-11), the special-gift-game execution unit 72*a* displays the second sheet exchange screen, i.e., the exchange report pop-up 62 (P6-12).

Although an aspect of the embodiment has been described with reference to the accompanying drawings, it goes without saying that the present invention is not limited to the embodiment described above. It would be obvious that a person skilled in the art could conceive of various modifications and amendments within the scope recited in the claims, and it will be understood that those modifications and amendments obviously belong to the technical scope.

In the above embodiment, the division of roles for processing executed in the player terminal 1 and the server 100 is merely an example. For example, although the lottery process is executed at the server 100 in the above embodiment, the lottery process may be executed at the player terminal 1.

Moreover, in the aforementioned embodiment, it is possible to change the special-gift sheet 44, i.e., the reward group information when the sheet exchange permission unit 74*a* in the player terminal 1 disables the sheet exchange button 46. That is, in the aforementioned embodiment, the sheet exchange permission unit 74*a* of the player terminal 1 is provided as the permission unit that permits the reward group information to be changed. It should be noted, however, that the server 100 may be provided with the permission unit, so that the permission unit can make the decision in S2-1.

In addition, in the aforementioned embodiment, the player is awarded a first special-gift sheet 44 the first time the player performs a login operation during an event holding period. Alternatively, the player may be awarded a first special-gift sheet 44 the first time the screen transitions to the lottery top screen during an event holding period.

Furthermore, information indicating which decision frame on the special-gift sheet 44 is an ungained frame and information indicating the current number of special-gift sheets 44, i.e., the number of times the special-gift sheet 44 has been exchanged, may be stored in the server 100. Also, these items of information may be transmitted from the server 100 to the player terminal 1 when the player performs a login operation.

In addition, in the aforementioned embodiment, the special-gift game is a so-called Bingo game, and the number of achieved reward groups is reported by displaying established lines on the special-gift sheet 44. It should be noted, however, that reporting the special-gift sheets 44, i.e., the number of achieved reward groups and reward groups, in the special-gift game is not essential. For example, in the aforementioned embodiment, it is assumed that reward group information is set such that a first reward group composed of all rewards having odd-numbered classes set therein and a second reward group composed of all rewards having even-numbered classes set therein are defined in that reward group information. Under this assumption, for example, a stamp sheet indicating a frame corresponding to each class may be provided, so that an achieved reward group can be reported as a result of the frame indicating the class of a gained reward being stamped. In any case, it suffices if reward group information in which at least one reward group configured by combining a plurality of rewards is defined is set and if a reward group in which the number of rewards determined to be won rewards has reached the predetermined number is decided as being an achieved reward group.

In addition, the aforementioned embodiment has been described assuming that a reward is determined in the lottery process to facilitate understanding. In fact, however, a plurality of winning types, i.e., a plurality of items of information are provided as what is won in the lottery process, so that a reward is awarded on the basis of the winning type that has been won. Also, for example, a class may be provided as a winning type, and a class may be determined in the lottery process. In this case, the player is awarded a reward on the basis of the determined winning type, i.e., the determined class. Furthermore, at this time, a reward group may be composed of winning types or may be composed of rewards.

In any case, it suffices if any of a plurality of winning types is determined, a reward is awarded to the player on the basis of the determined winning type, reward group information in which at least one reward group configured by combining a plurality of winning types or a plurality of rewards is defined is set, a reward group in which the number of determined winning types or the number of rewards awarded to the player has reached the predetermined number is decided as being an achieved reward group, and the reward group information can be changed on condition that the number of achieved reward groups has reached the preset particular number.

In addition, although the special gift corresponding to the number of achieved reward groups is awarded to the player in the aforementioned embodiment, awarding a special gift is not essential. For example, even when a line is established on the special-gift sheet 44, the special-gift game may be executed just as a presentation, without awarding the player a special gift.

Also, for example, if a reward frame is not changed to a gained frame even after the lottery process is executed a predetermined number of times in the aforementioned special-gift game, i.e., if the player fails to win a predetermined reward a predetermined number of times or more, a so-called ceiling function may be invoked to force the reward frame corresponding to the predetermined reward to change to a gained frame. In this case, it suffices if the reward frame is forced to change to a gained frame; the reward corresponding to the reward frame may be or need not be awarded to the player.

Furthermore, if not a predetermined reward is won even after the lottery process is executed a predetermined number of times, this predetermined reward may be won.

In addition, although suggestion presentations are executed in the aforementioned embodiment, suggestion presentations are not essential. Also, the content of suggestion presentations is merely an example.

Note that information processing programs for executing the processes in the above-described embodiment may be stored in a computer-readable storage medium, and may be provided in the form of a storage medium. Furthermore, a game terminal device including this storage medium may be provided. Alternatively, the above-described embodiments may be embodied as information processing methods for realizing the functions and the steps shown in the flowcharts.

What is claimed is:

1. A non-transitory computer readable medium storing a program causing a computer to perform a method comprising:

displaying a first game screen on a display device of a player terminal;

receiving, in response to displaying the first game screen and from an input unit of the player terminal, a first player input regarding a computer game;

displaying, in response to receiving the first player input, a second game screen for the computer game on the display device, wherein the second game screen comprises a player interface that comprises a return tab, a gift sheet, and a sheet exchange button, wherein the return tab is configured to cause the second game screen to transition to the first game screen, and wherein the gift sheet displays a first plurality of game items associated with first reward group information for a first reward group among a plurality of reward groups in the computer game;

receiving, in response to displaying the second game screen and from the input unit, a second player input regarding the gift sheet;

determining, in response to receiving the second player input, a first winning type of game item among a plurality of winning types of game items based on the gift sheet in the second game screen;

awarding a reward among the first plurality of game items to a player within the computer game based on the first winning type of game item;

determining whether a sheet exchange condition is satisfied for the first reward group, wherein the sheet exchange condition is based on a number of winning types of game items or a number of rewards awarded to the player having reached a predetermined number;

enabling the sheet exchange button in the second game screen in response to determining that the sheet exchange condition is satisfied;

receiving, in response to enabling the sheet exchange button and from the input unit, a third player input regarding the sheet exchange button in the second game screen;

changing, in response to receiving the third player input regarding the sheet exchange button, the first reward group information for the gift sheet to a second reward group information associated with a second reward group among the plurality of reward groups comprising a second plurality of game items, wherein the second plurality of game items are different from the first plurality of game items; and displaying the second game screen with the gift sheet based on the second plurality of game items.

2. The non-transitory computer readable medium according to claim 1, wherein the method further comprises:

deciding, if all the plurality of winning types constituting one of at least one reward group among the plurality of reward groups are determined or all of a plurality of rewards constituting the first reward group are awarded to the player, the first reward group as an achieved reward group, and wherein the predetermined number is smaller than a number of reward groups defined in one of the first plurality of game items of the first reward group information.

3. The non-transitory computer readable medium according to claim 1, wherein the plurality of winning types include winning types that are determined at probabilities different from each other.

4. The non-transitory computer readable medium according to claim 2, wherein the plurality of winning types include winning types that are determined at probabilities different from each other.

5. The non-transitory computer readable medium according to claim 1, wherein the method further comprises:

awarding the player a special gift corresponding to a number of achieved reward groups.

6. The non-transitory computer readable medium according to claim 2, wherein the method further comprises:

awarding the player a special gift corresponding to a number of achieved reward groups.

7. The non-transitory computer readable medium according to claim 3, wherein the method further comprises:

awarding the player a special gift corresponding to a number of achieved reward groups.

8. The non-transitory computer readable medium according to claim 4, wherein the method further comprises:

awarding the player a special gift corresponding to a number of achieved reward groups.

9. The non-transitory computer readable medium according to claim 1, wherein the method further comprises:

executing a suggestion presentation for suggesting whether the number of winning types of game items or the number of rewards awarded to the player has reached the predetermined number.

10. The non-transitory computer readable medium according to claim 2, wherein the method further comprises:

executing a suggestion presentation for suggesting whether the number of winning types of game items or the number of rewards awarded to the player has reached the predetermined number.

11. The non-transitory computer readable medium according to claim 3, wherein the method further comprises:

executing a suggestion presentation for suggesting whether the number of winning types of game items or the number of rewards awarded to the player has reached the predetermined number.

12. The non-transitory computer readable medium according to claim 4, wherein the method further comprises:

executing a suggestion presentation for suggesting whether the number of winning types of game items or the number of rewards awarded to the player has reached the predetermined number.

13. The non-transitory computer readable medium according to claim 5, wherein the method further comprises:

executing a suggestion presentation for suggesting whether the number of winning types of game items or the number of rewards awarded to the player has reached the predetermined number.

14. The non-transitory computer readable medium according to claim 6, wherein the method further comprises:

executing a suggestion presentation for suggesting whether the number of winning types of game items or the number of rewards awarded to the player has reached the predetermined number.

15. The non-transitory computer readable medium according to claim 7, wherein the method further comprises:

executing a suggestion presentation for suggesting whether the number of winning types of game items or the number of rewards awarded to the player has reached the predetermined number.

16. The non-transitory computer readable medium according to claim 8, wherein the method further comprises:

executing a suggestion presentation for suggesting whether the number of winning types or the number of rewards awarded to the player has reached the predetermined number.

17. An information processing method comprising:

displaying a first game screen on a display device of a player terminal;

receiving, in response to displaying the first game screen and from an input unit of the player terminal, a first player input regarding a computer game;

displaying, in response to receiving the first player input, a second game screen for the computer game on the display device, wherein the second game screen comprises a player interface that comprises a return tab, a gift sheet, and a sheet exchange button, wherein the return tab is configured to cause the second game screen to transition to the first game screen, and wherein the gift sheet displays a first plurality of game items associated with first reward group information for a first reward group among a plurality of reward groups in the computer game;

receiving, in response to displaying the second game screen and from the input unit, a second player input regarding the gift sheet;

determining, in response to receiving the second player input, a first winning type of game item among a plurality of winning types of game items based on the gift sheet in the second game screen;

awarding a reward among the first plurality of game items to a player within the computer game based on the first winning type of game item;

determining whether a sheet exchange condition is satisfied for the first reward group, wherein the sheet exchange condition is based on a number of winning types of game items or a number of rewards awarded to the player having reached a predetermined number;

enabling the sheet exchange button in the second game screen in response to determining that the sheet exchange condition is satisfied;

receiving, in response to enabling the sheet exchange button and from the input unit, a third player input regarding the sheet exchange button in the second game screen;

changing, in response to receiving the third player input regarding the sheet exchange button, the first reward group information for the gift sheet to a second reward group information associated with a second reward group among the plurality of reward groups comprising a second plurality of game items, wherein the second plurality of game items are different from the first plurality of game items; and displaying the second game screen with the gift sheet based on the second plurality of game items.

18. An information processing system comprising:

a processor; and a memory connected to the processor, wherein the memory comprises a program that, when executed by the processor, is configured to perform a method comprising:

displaying a first game screen on a display device of a player terminal;

receiving, in response to displaying the first game screen and from an input unit of the player terminal, a first player input regarding a computer game;

displaying, in response to receiving the first player input, a second game screen for the computer game on the display device, wherein the second game screen comprises a player interface that comprises a return tab, a gift sheet, and a sheet exchange button, wherein the return tab is configured to cause the second game screen to transition to the first game screen, and wherein the gift sheet displays a first plurality of game items associated with first reward group information for a first reward group among a plurality of reward groups in the computer game;

receiving, in response to displaying the second game screen and from the input unit, a second player input regarding the gift sheet;

determining, in response to receiving the second player input, a first winning type of game item among a plurality of winning types of game items based on the gift sheet in the second game screen;

awarding a reward among the first plurality of game items to a player within the computer game based on the first winning type of game item;

determining whether a sheet exchange condition is satisfied for the first reward group, wherein the sheet exchange condition is based on a number of winning types of game items or a number of rewards awarded to the player having reached a predetermined number;

enabling the sheet exchange button in the second game screen in response to determining that the sheet exchange condition is satisfied;

receiving, in response to enabling the sheet exchange button and from the input unit, a third player input regarding the sheet exchange button in the second game screen;

changing, in response to receiving the third player input regarding the sheet exchange button, the first reward group information for the gift sheet to a second reward group information associated with a second reward group among the plurality of reward groups comprising a second plurality of game items, wherein the second plurality of game items are different from the first plurality of game items; and displaying the second game screen with the gift sheet based on the second plurality of game items.

* * * * *